(12) United States Patent
Boesel

(10) Patent No.: US 11,052,340 B1
(45) Date of Patent: Jul. 6, 2021

(54) CYLINDRICAL FILTER CARTRIDGE CLEANING DEVICE

(71) Applicant: Bradley W. Boesel, Phoenix, AZ (US)

(72) Inventor: Bradley W. Boesel, Phoenix, AZ (US)

( * ) Notice: Subject to any disclaimer, the term of this patent is extended or adjusted under 35 U.S.C. 154(b) by 0 days.

(21) Appl. No.: 17/091,621

(22) Filed: Nov. 6, 2020

(51) Int. Cl.
*B01D 41/04* (2006.01)
*B08B 3/04* (2006.01)
*B08B 3/02* (2006.01)

(52) U.S. Cl.
CPC .............. *B01D 41/04* (2013.01); *B08B 3/024* (2013.01)

(58) Field of Classification Search
CPC ................................ B01D 41/04; B08B 3/024
See application file for complete search history.

(56) References Cited

U.S. PATENT DOCUMENTS

| | | | | | |
|---|---|---|---|---|---|
| 2,178,701 | A | * | 11/1939 | Petre | F02M 35/08 134/33 |
| 2,249,521 | A | * | 7/1941 | Graham | B01D 41/04 427/140 |
| 3,089,167 | A | * | 5/1963 | Jahn | B01D 41/04 15/4 |
| 3,174,490 | A | * | 3/1965 | Flarsheim | B01D 41/04 134/80 |
| 3,442,273 | A | * | 5/1969 | Hanish | B01D 41/04 134/100.1 |
| 3,526,237 | A | * | 9/1970 | Neill, Jr. | B01D 21/003 134/58 R |
| 3,608,567 | A | * | 9/1971 | Neill, Jr. | B01D 41/04 134/58 R |
| 4,299,245 | A | * | 11/1981 | Clapper | B08B 3/02 118/318 |
| 5,135,580 | A | * | 8/1992 | Cantrell | B01D 41/04 134/152 |
| 5,322,535 | A | * | 6/1994 | Simms | B01D 41/04 55/294 |
| 7,393,387 | B1 | * | 7/2008 | Heisey | B01D 41/04 134/153 |
| 9,675,910 | B1 | * | 6/2017 | Wade | B05B 15/60 |
| 10,277,163 | B1 | * | 4/2019 | Meller | H02S 40/10 |
| 2008/0006290 | A1 | * | 1/2008 | Yamanaka | B08B 3/04 134/1 |
| 2014/0251387 | A1 | * | 9/2014 | Royce | B01D 46/0073 134/33 |

* cited by examiner

*Primary Examiner* — Benjamin L Osterhout
(74) *Attorney, Agent, or Firm* — Kenneth Motolenich-Salas

(57) ABSTRACT

A cartridge cleaning device comprising a cleaning nozzle joined to means for vertically displacing the nozzle, a power unit, and a rotatable platform. Fluid is introduced to the device and split into two streams, one stream providing fluid to the cleaning nozzle and the other stream directed to the power unit and effectuating rotation of a power wheel, thereby generating a torque which is transferred to the means for vertically displacing the nozzle and the rotatable platform. The torque to the means for vertically displacing the cleaning nozzle effectuates vertical displacement of the nozzle. The torque to the rotatable platform effectuates rotation of the rotatable platform on which at least one cartridge is placed during cleaning operations. The cleaning nozzle directs a stream onto the cartridge surface and perpendicular to the cartridge longitudinal axis and is displaced vertically in concert with cartridge rotation.

9 Claims, 14 Drawing Sheets

POSTERIOR SIDE VIEW

DISCHARGE SIDE VIEW

ANTERIOR SIDE VIEW

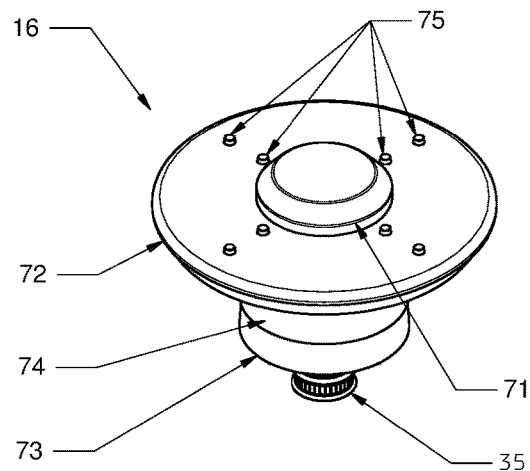
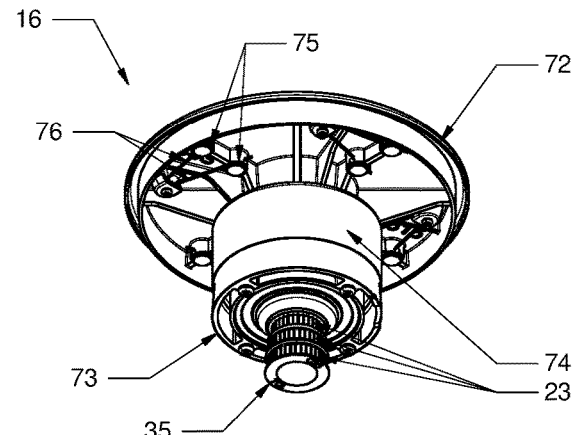
Figure 6(a)   Figure 6(b)
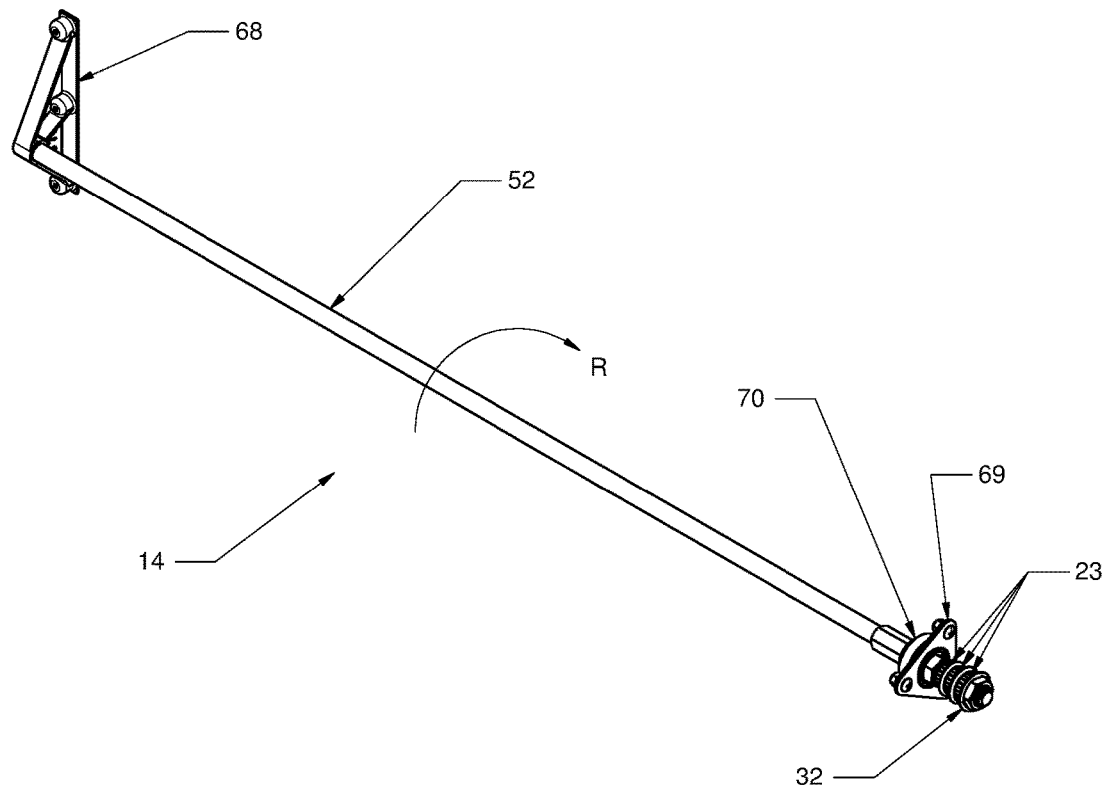
Figure 7

CYLINDRICAL FILTER CARTRIDGE CLEANING DEVICE

CLAIM OF PRIORITY

This application claims the benefit of and priority to Provisional Patent Application No. 62/974,087 filed Nov. 12, 2019, the entirety of which is incorporated herein by this reference.

FIELD OF THE INVENTION

The invention is an apparatus for automated cleaning of filter cartridges (referred to herein as well as "cartridges") having a generally cylindrical shape with a longitudinal axis and planar ends substantially perpendicular to the longitudinal axis. Examples of such cartridges may be found in swimming pool and spa filtration systems as well as various commercial and industrial systems.

BACKGROUND OF THE INVENTION

Swimming pools, spas, and various commercial and industrial processes require fluid filtration. Cartridge filters, or cartridges, are a preferred method of effecting that filtration. In the course of operating these filtration systems, the outer surface of a cartridge becomes contaminated and the cartridge must be replaced or cleaned. Cleaning these cartridges is a more cost effective and environmentally friendly solution than replacement; however, cleaning this type of cartridge is typically time consuming, labor intensive, and messy, with a person using a hose or pressure washer and spray nozzle to clean the cartridge surface. There are multiple devices in the prior art available to assist in cleaning such cartridges. The prior art includes various filter cartridge cleaning devices. U.S. Pat. No. 9,675,910 to Wade et. al. provides a comprehensive summary of the relevant prior art.

The prior art devices have limitations. For example, such devices typically require considerable attention and/or effort by the person doing the cleaning. The present invention minimizes the human effort required to clean these types of cartridges and provides for a well-regulated and efficient process to thoroughly clean a variety of cartridge diameters and lengths.

SUMMARY OF THE INVENTION

A first aspect of the invention comprises a cartridge cleaning device comprising (a) a fluid inlet valve in fluid communication with a pressurized fluid source and capable of controlling the flow of fluid through the valve; (b) a spray subassembly in fluid communication with the fluid inlet valve and comprising one or more nozzles; (c) a rotatable lead screw with an upper end and a lower end and wherein the lead screw (i) is mateably joined to the spray subassembly so as to effectuate vertical displacement of the spray subassembly upon rotation of the lead screw and (ii) has a lead screw driven pulley attached to the lower end of the lead screw; (d) a rotatable platform subassembly comprising a rotatable platform spindle onto which at least one cartridge is positioned and a rotatable platform driven pulley attached to the rotatable platform spindle; (e) a power unit in fluid communication with the fluid inlet valve and comprising a power unit nozzle and a power wheel in rotatable contact with a plurality of compound gears, wherein at least one compound gear is rotatably attached to (i) a lead screw driving pulley joined via a lead screw drive belt with the lead screw driven pulley and (ii) a rotatable platform driving pulley joined via a rotatable platform driving belt with the rotatable platform driven pulley; (f) wherein fluid from the pressurized fluid source is directed from the fluid inlet valve to the spray subassembly and emitted from the one or more nozzles; (g) wherein fluid from the pressurized fluid source is directed from the fluid inlet valve to the power unit and wherein fluid is emitted from the power unit nozzle toward the power wheel causing rotation of the power wheel and wherein the torque from the rotating power wheel is transferred to the rotatable platform driving pulley and the lead screw driving pulley through the plurality of compound gears; (h) wherein the torque from the rotatable platform driving pulley is transferred to the rotatable platform driven pulley thereby effectuating rotation of the rotatable platform; and (i) wherein the torque from the lead screw driving pulley is transferred to the lead screw driven pulley thereby effectuating rotation of the lead screw and vertical displacement of the spray subassembly.

A second aspect of the invention comprises a cartridge cleaning device comprising (a) a fluid inlet valve in fluid communication with a pressurized fluid source; (b) a spray subassembly in fluid communication with the fluid inlet valve and comprising one or more nozzles; (c) a spray subassembly belt drive system comprising a carriage drive belt looped around a driven pulley and one or more idler pulleys wherein the spray subassembly is joined to the carriage drive belt; (d) a rotatable platform subassembly comprising a rotatable platform spindle onto which at least one cartridge is positioned, wherein the rotatable platform subassembly is joined to a rotatable platform belt and pulley system; (e) a power unit in fluid communication with the fluid inlet valve and comprising a power unit nozzle and a power wheel in rotatable contact with a plurality of compound gears, wherein at least one compound gear is rotatably attached to (i) the spray subassembly belt drive system and (ii) a rotatable platform belt and pulley system; (f) wherein fluid from the pressurized fluid source is directed from the fluid inlet valve to the spray subassembly and emitted from the one or more nozzles; (g) wherein fluid from the pressurized fluid source is directed from the fluid inlet valve to the power unit and wherein fluid is emitted from the power unit nozzle toward the power wheel causing rotation of the power wheel and wherein the torque from the rotating power wheel is transferred to the rotatable platform belt and pulley system and the spray subassembly belt drive system through the plurality of compound gears; (h) wherein the torque from the rotatable platform belt and pulley system effectuates rotation of the rotatable platform; and (i) wherein the torque from the spray subassembly belt drive system effectuates rotation of the carriage drive belt and vertical displacement of the spray subassembly joined to the carriage drive belt.

A third aspect of the invention comprises a cartridge cleaning device comprising (a) a fluid inlet valve in fluid communication with a pressurized fluid source wherein the fluid inlet valve is comprised of a valve body attached to the chassis; (b) a spray subassembly in fluid communication with the fluid inlet valve and comprising one or more nozzles; (c) means for vertically displacing the spray subassembly; (d) a rotatable platform subassembly comprising a rotatable platform spindle onto which at least one cartridge is positioned; (e) a power unit in fluid communication with the fluid inlet valve and comprising a power unit nozzle and a power wheel in rotatable contact with a plurality of compound gears; (f) means for transferring torque from the power wheel to the means for vertically displacing the spray subassembly; and (g) means for transferring torque from the power wheel to the rotatable platform subassembly.

A fourth aspect of the invention comprises a cartridge cleaning device comprising (a) a fluid inlet valve in fluid communication with a pressurized fluid source and capable of controlling the flow of fluid through the valve; (b) a spray subassembly in fluid communication with the fluid inlet valve and comprising one or more nozzles; (c) means for vertically displacing the spray subassembly; (d) a rotatable platform subassembly comprising a rotatable platform spindle onto which at least one cartridge is positioned; (d) a first power unit in fluid communication with the fluid inlet valve and comprising a first power unit nozzle and a first power unit power wheel in rotatable contact with a plurality of first power unit compound gears; (e) a second power unit in fluid communication with the fluid inlet valve and comprising a second power unit nozzle and a second power unit power wheel in rotatable contact with a plurality of second power unit compound gears; (f) wherein fluid from the pressurized fluid source is directed from the fluid inlet valve to the spray subassembly and emitted from the one or more nozzles; (g) wherein fluid from the pressurized fluid source is directed from the fluid inlet valve to the first power unit and wherein fluid is emitted from the first power unit nozzle toward the first power unit power wheel causing rotation of said power wheel and generating a torque; (h) wherein fluid from the pressurized fluid source is directed from the fluid inlet valve to the second power unit and wherein fluid is emitted from the second power unit nozzle toward the second power unit power wheel causing rotation of said power wheel and generating a torque, and further comprising (i) means for transferring the torque from the rotating first power unit power wheel to the means for vertically displacing the spray subassembly; and (j) means for transferring the torque from the rotating second power unit power wheel to the rotatable platform subassembly causing rotation of the rotatable platform spindle.

By way of example only, specific embodiments of the invention will now be described, with reference to the accompanying drawings.

DESCRIPTION OF THE DRAWINGS

FIG. 1(*b*) is a perspective view of an embodiment of the present invention;

FIG. 2(*b*) is a perspective view of an embodiment of the present invention;

FIG. 3(*b*) is an elevation view of the posterior side of an embodiment of the present invention;

FIG. 3(*c*) is an elevation view of an embodiment of the present invention;

FIG. 3(*d*) is an elevation view of the anterior side of an embodiment of the present invention;

FIG. 3(*e*) is a plan view of various elements comprising an embodiment of the present invention as viewed from below;

FIG. 4(*b*) is a perspective view of the start/stop valve according to an embodiment of the present invention;

FIG. 5(*b*) is a perspective view of the power unit according to an embodiment of the present invention;

FIG. 6(*a*) is a perspective view of the rotatable platform according to an embodiment of the present invention;

FIG. 6(*b*) is a perspective view of the rotatable platform according to an embodiment of the present invention;

FIG. 7 is a perspective view of the lead screw subassembly according to an embodiment of the present invention;

FIG. 8(*b*) is a perspective view of the nozzle array subassembly according to an embodiment of the present invention;

FIG. 8(*c*) is a perspective view of the nozzle array subassembly according to an embodiment of the present invention;

FIG. 9(*b*) is a perspective view of the up-stop subassembly according to an embodiment of the present invention;

FIG. 10(*b*) is a perspective view of an embodiment of the present invention;

FIG. 15(*b*) is a perspective view of the spray subassembly according to an embodiment of the present invention;

FIG. 17(*b*) is a perspective view of a power unit according to an embodiment of the present invention;

DETAILED DESCRIPTION OF THE PREFERRED EMBODIMENTS

Figures 1A, 1B:
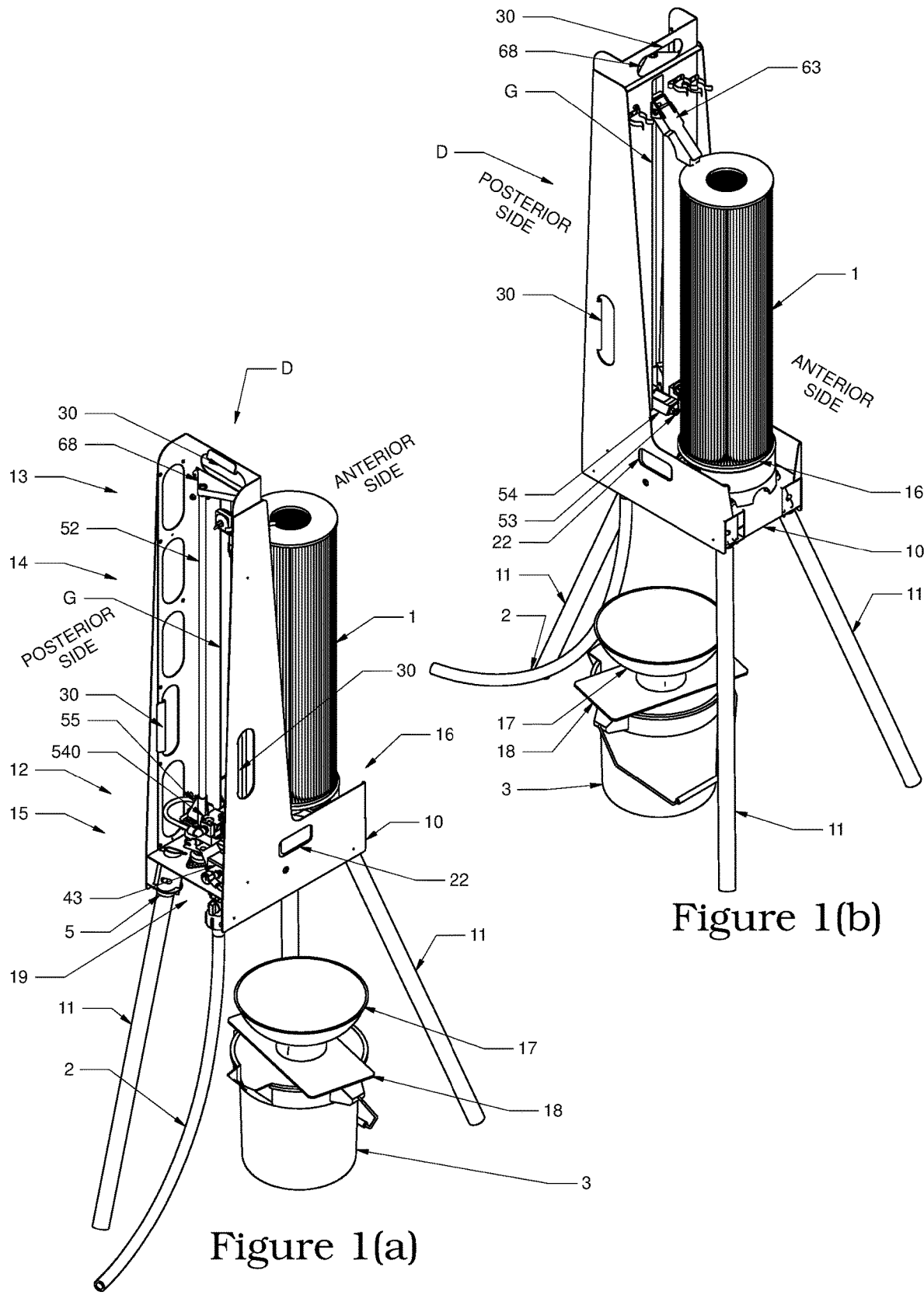
FIG. 1(*a*) is a perspective view of an embodiment of the present invention.

Herein, the terms "filter". "filter cartridge", and "cartridge", element 1 are used interchangeably to refer to cylindrical filter elements having a longitudinal axis, an outer surface, an annular opening along the longitudinal axis, and ends substantially perpendicular to the longitudinal axis as shown in FIGS. 1(*a*), 1(*b*), 10(*a*), and 10(*b*). The outer surface of cartridge 1 may or may not be pleated and may or may not have a circular cross section. Examples of these types of cartridges 1 may be found in swimming pool, spa, and various industrial and commercial filtration systems.

Moreover, herein the term "working surface" is used to describe the surface of the cartridge 1 through which the fluid being filtered passes and upon which is deposited material removed from the fluid being filtered. This surface may also be described as the outer surface of a cartridge 1 as mentioned above.

Further, herein the term "pressurized water source" includes but is not limited to a common spigot connected to a municipal water supply system with or without a separate pump to modify the flow and/or pressure of water issuing from the spigot. Additionally, herein the term "pressurized water source" may also include but is not limited to a separate device supplying pressurized fluid to the invention from a reservoir, recirculation tank, or any source other than a common spigot.

Furthermore, herein the term "water" is meant to be illustrative of a typical working fluid and is not exclusive of any other suitable working fluid, with the terms "water", "working fluid" and "fluid" used interchangeably herein.

Figure 5A:
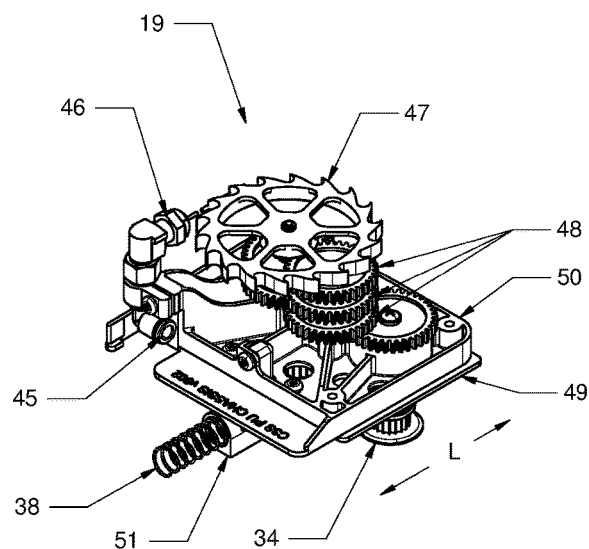
FIG. 5(*a*) is a perspective view of the power unit according to an embodiment of the present invention.
Figure 5B:
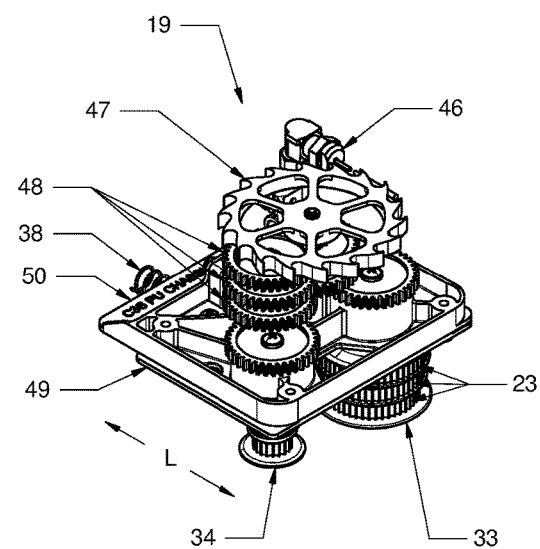

Also, herein the term "nozzle" is used to describe an element of the filter cartridge cleaning device D (for example, element 46 in FIGS. 5(*a*) and 5(*b*)) that directs a fluid stream and the term "nozzle array" is used to describe one or more nozzles in fluid communication with a pressurized fluid source (see, for example, element 53 in FIGS. 8(*a*), 8(*b*), 8(*c*), 15(*a*), and 15(*b*)).

In addition, herein the term "spray subassembly", element 12, is used to describe the components and elements of the filter cartridge cleaning device D shown in FIGS. 8(*a*), 8(*b*), 8(*c*), 12, 15(*a*), and 15(*b*).

Furthermore, herein the term "chassis", element 10 (e.g., see FIGS. 1(*a*) and 1(*b*)), is used to describe a structure of the filter cartridge cleaning device D to which other components and subassemblies of the filter cartridge cleaning device D are attached in a preferred embodiment.

Moreover, herein the terms "cleaning cycle" and "operational cycle" are used interchangeably to describe a series of events wherein (i) the spray subassembly 12 of the filter cartridge cleaning device D is displaced vertically along a direction of motion which is parallel to the longitudinal axis of the cartridge 1; (ii) the start/stop valve 15 is opened whereby water is introduced to the device D to provide both force to actuate one or more power units 19 of the device D to effectuate vertical displacement of the spray subassembly 12 and rotation of the rotatable platform spindle 72 of the rotatable platform subassembly 16 as well as a cartridge-cleaning fluid stream directed from a nozzle array 53 which is comprised of one or more nozzles on the spray subassembly 12; (iii) at least one cartridge 1 positioned on the rotatable platform spindle 72 is rotated about its longitudinal axis while the spray subassembly 12 is simultaneously displaced vertically, with such cartridge 1 rotation allowing the entirety of the working surface of the cartridge 1 to be impacted one or more times by a stream issuing from a nozzle array 53 and (iv) the start/stop valve 15 is closed whereby water flow to the device is cut off and the cycle is completed.

In addition, herein the terms "cleaning" and "processing" are used interchangeably.

The terms "nozzle array subassembly" and "spray subassembly", element 12 (see FIGS. 8(*a*), 8(*c*), 12, 15(*a*), and 15(*b*)), are used interchangeably herein.

With reference to one or more figures, filter cartridge cleaning device D comprises a start/stop valve 15, one or more power units 19, a rotatable platform subassembly 16, a spray subassembly 12, and one of (i) a lead screw subassembly 14 (FIGS. 1(*a*), 3(*a*), 7, and 11) and (ii) spray subassembly belt drive system 29 (FIGS. 10(*a*) and 10(*b*)).

In a preferred embodiment, filter cartridge cleaning device D further comprises an up-stop subassembly 13.

In a preferred embodiment, filter cartridge cleaning device D further comprises a chassis 10 and each of the start/stop valve 15, the one or more power units 19, the rotatable platform subassembly 16, the spray subassembly 12, and the lead screw subassembly 14 or spray subassembly belt drive system 29 are directly or indirectly mounted to the chassis 10. In a preferred embodiment wherein filter cartridge cleaning device D further comprises the up-stop subassembly 13, such subassembly 13 is directly or indirectly mounted to the chassis 10.

The chassis 10 is preferably an L-shaped structure comprised of a (i) vertical section with an upper end and a lower end and which has a gap G extending vertically from a position proximal the upper end of the vertical section to a position proximal the lower end of the vertical section, and (ii) a horizontal section integral with the vertical section wherein the horizontal section has an opening O (see FIGS. 3(*e*) and 11). More preferably, chassis 10 has a plurality of detachable legs 11 with each preferably securable in a socket 5 (see FIG. 11) formed on the underside of the horizontal section of the chassis 10 so as to vertically support the chassis 10 as shown in FIGS. 1(*a*) and 1(*b*) during device D operation. When not disposed in a socket 5, each leg 11 may be securable using clips or another securing device in a void space in the vertical section of the chassis 10 for convenience of transport as shown in FIGS. 2(*a*) and 2(*b*).

The chassis 10 has one or more integrated handles 30 to facilitate manual transport and a discharge port 22 through which the working fluid, dirt, and debris ("discharge") may pass during operation of filter cartridge cleaning device D, with such discharge collectable in a bucket 3 with or without using a funnel 17 and funnel support 18 located beneath the device D. Alternatively, such discharge from the device D may be allowed to fall to the ground. For convenient transport of the funnel support 18, the funnel support 18 may be located behind and constrained by two of the detachable legs 11 (see FIG. 2(*b*)).

The chassis 10, in preferred embodiments, includes features to assist with the portability of device D, such features including but not limited to the placement of one or more wheels on the chassis 10, one or more wheels on the lower portion of one or more of the legs 11, or clips to allow for the mounting of device D to a wheelbarrow or wheeled cart. Moreover, in preferred embodiments, the chassis 10 is collapsible or comprised of a plurality of detachable members.

Figure 4A:
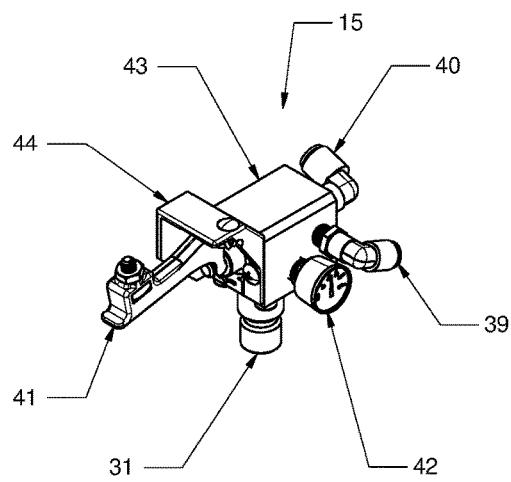
FIG. 4(*a*) is a perspective view of the start/stop valve according to an embodiment of the present invention.
Figure 4B:
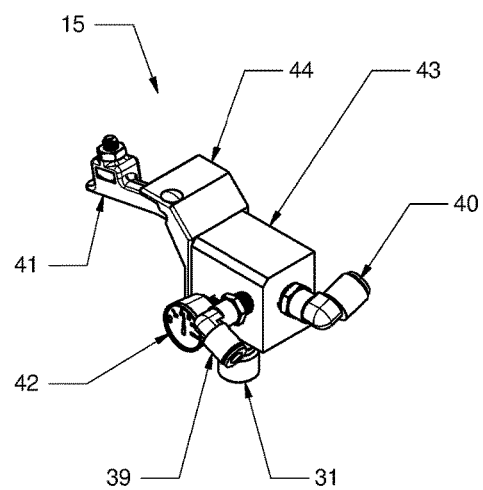

The start/stop valve 15 (shown in FIGS. 4(*a*) and 4(*b*)) of filter cartridge cleaning device D is comprised of a valve body 43 that is attached to the chassis 10. Integrated into the valve body 43 is (i) a water supply port 31 that is couplable to a source of pressurized water, typically from a garden hose 2 (shown in FIGS. 1(*a*) and 1(*b*)), (ii) a power unit supply port 39, and (iii) a spray subassembly supply port 40. The start/stop valve 15 effectuates the splitting of the input stream to the start/stop valve 15 via the water supply port 31 into two discharge (or output) streams: one stream toward the one or more power units 19 of the device D via the power unit supply port 39 and a second stream toward the spray subassembly 12 via the spray subassembly supply port 40. The fluid stream to the one or more power units 19 effectuates (i) vertical displacement of the spray subassembly 12 and (ii) rotation of the rotatable platform spindle 72 onto which at least one cartridge 1 is positioned during cleaning operation. The fluid stream from the start/stop valve 15 to the spray subassembly 12 provides a cartridge-cleaning fluid stream discharged through a nozzle array 53 comprised of one or more nozzles that directs flow onto the cartridge 1 surface to effectuate removal of debris on such cartridge 1 surface.

Attached to the valve body 43 of the start/stop valve 15 is an operating lever pivot support 44 which supports an operating lever 41 comprised of a fixed end held in place by the operating lever pivot support 44 and a free end which protrudes from and is distal the valve body 43. The operating lever 41 of start/stop valve 15 is connected to a water flow regulator (not shown) positioned in the interior of the valve body 43 which can allow or prevent the flow of fluid from the water supply port 31 to the power unit supply port 39 and the spray subassembly supply port 40. Lifting the free end of the operating lever 41 of the start/stop valve 15 controls the water flow regulator to allow fluid flow from the water supply port 31 to the power unit supply port 39 and the spray subassembly supply port 40. Depressing the free end of the operating lever 41 of the start/stop valve 15 controls the water flow regulator to stop the fluid flow to the power unit supply port 39 and the spray subassembly supply port 40.

Preferably, the start/stop valve 15 also comprises a fluid supply pressure gage 42 mounted to the valve body 43 which is in fluid communication with the water supply port 31 and provides a visual reference to the fluid pressure at the water supply port 31 of the start/stop valve IS. In a preferred embodiment, the power unit supply port 39 of the start/stop valve 15 is in fluid communication with a first power unit fluid inlet port 45a on a first power unit 19a and a second power unit fluid inlet port 45b on a second power unit 19b. Moreover, the spray subassembly port 40 of the start/stop valve 15 is in fluid communication with the nozzle array 53 of the spray subassembly 12 (see FIGS. 8(a), 8(b), 8(c), 15(a), and 15(b)). In an alternative preferred embodiment, device D comprises a power unit 19, and the power unit supply port 39 of the start/stop valve 15 is in fluid communication with the power unit fluid inlet port 45 of the power unit 19 (see FIGS. 5(a) and 5(b)) and the spray subassembly port 40 of the start/stop valve 15 is in fluid communication with the nozzle array 53 of the spray subassembly 12 (see FIGS. 8(a), 8(b), 8(c), 15(a), and 15(b)).

During operation of the filter cartridge cleaning device D, water from a pressurized water source flows through the start/stop valve 15 by connecting a hose 2 in fluid communication with the pressurized water source to the water supply port 31 of the start/stop valve 15. Water then flows out of the start/stop valve 15 through (i) the spray subassembly supply port 40, which connects to and is in fluid communication with the nozzle array 53 of the spray subassembly 12, and (ii) the power unit supply port 39, which connects to and is in fluid communication with each of the one or more power units 19. In a preferred embodiment wherein cleaning device D comprises one power unit 19, the power unit supply port 39 of the start/stop valve 15 is in fluid communication with the power unit fluid inlet port 45 of the power unit 19, with depression of the free end of the operating lever 41 of the start/stop valve 15 controlling the water flow regulator and stopping the fluid flow out of the start/stop valve 15 to the spray subassembly 12 and the power unit 19. In embodiments wherein the spray subassembly 12 (FIGS. 1(a), 2(a), 2(b), 3(b), 8(a) through (c), and 11) is vertically displaced by rotation of the lead screw 52 to which the spray subassembly 12 is mateably joined, fluid flow to the power unit 19 provides force to effectuate (i) the rotation of the lead screw 52 which causes the vertical displacement of the spray subassembly 12 and (ii) the rotation of the rotatable platform spindle 72 of the rotatable platform subassembly 16 onto which is positioned a cartridge 1, thereby effectuating cartridge 1 rotation during cleaning operations. Alternatively, in a preferred embodiment, fluid flow to a first power unit 19a provides force to effectuate the rotation of the lead screw 52 which causes the vertical displacement of the spray subassembly 12 and fluid flow to a second power unit 19b provides force to effectuate the rotation of the rotatable platform spindle 72 of the rotatable platform subassembly 16 onto which is positioned a cartridge 1, thereby effectuating cartridge 1 rotation during cleaning operations.

Figure 10A:
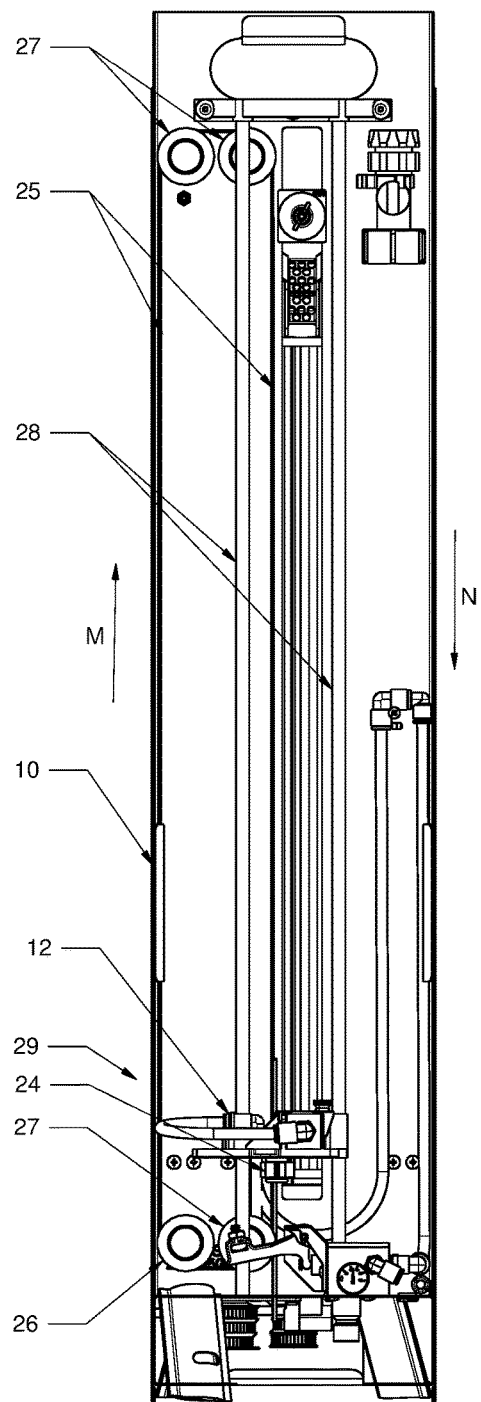
FIG. 10(*a*) is an elevation view of the posterior side of an embodiment of the present invention.

In embodiments wherein the spray subassembly 12 is vertically displaced by a spray subassembly belt drive system 29 (FIGS. 10(a) and (b)), fluid flow to the power unit 19 provides force to effectuate (i) the rotation of the driven pulley 26 which causes vertical displacement of a carriage drive belt 25 which is joined to the spray subassembly 12 and (ii) the rotation of the rotatable platform spindle 72 of the rotatable platform subassembly 16 onto which is positioned a cartridge 1, thereby effectuating cartridge 1 rotation during cleaning operations.

Figure 3A:
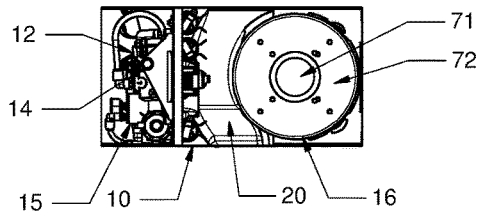
FIG. 3(*a*) is a plan view of various elements comprising an embodiment of the present invention as viewed from above.
Figure 3B:
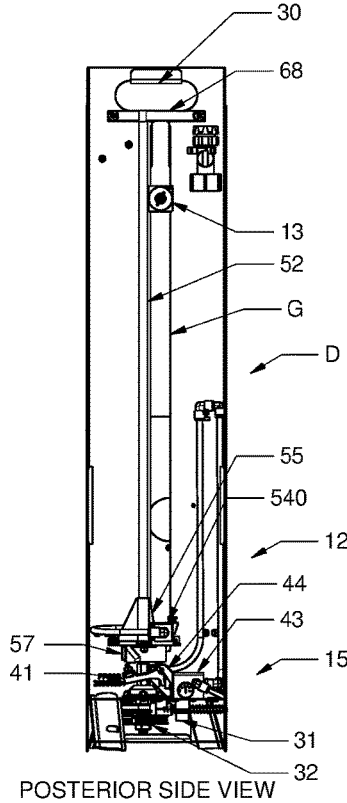
Figure 3C:
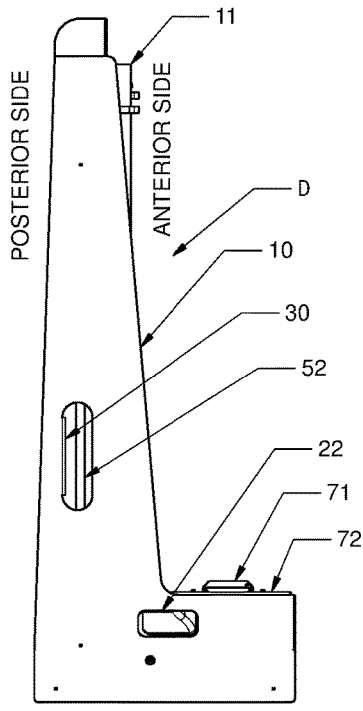
Figure 3D:
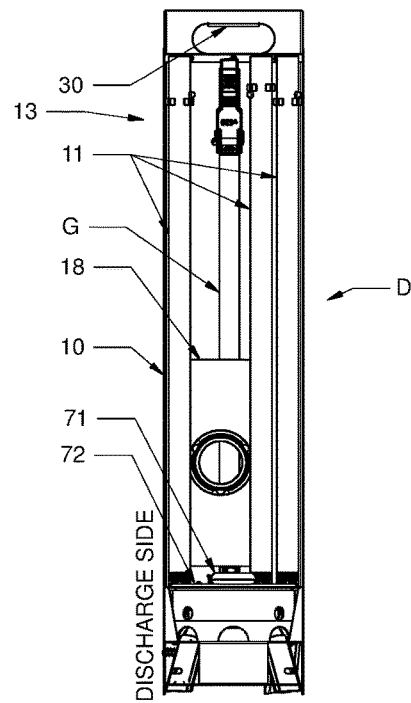
Figure 3E:
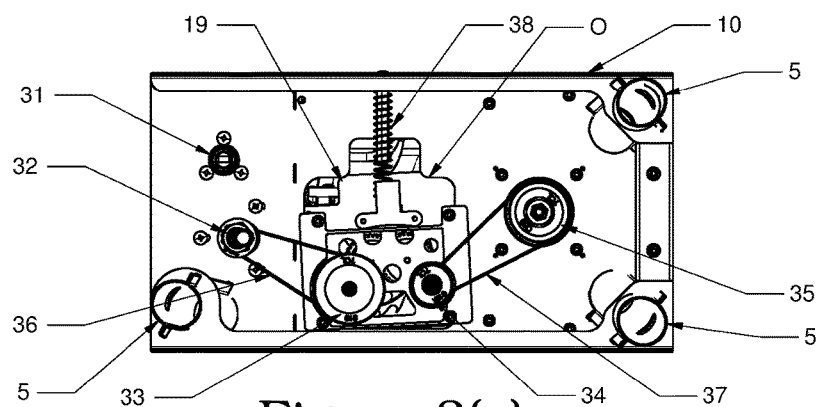
Figure 11:
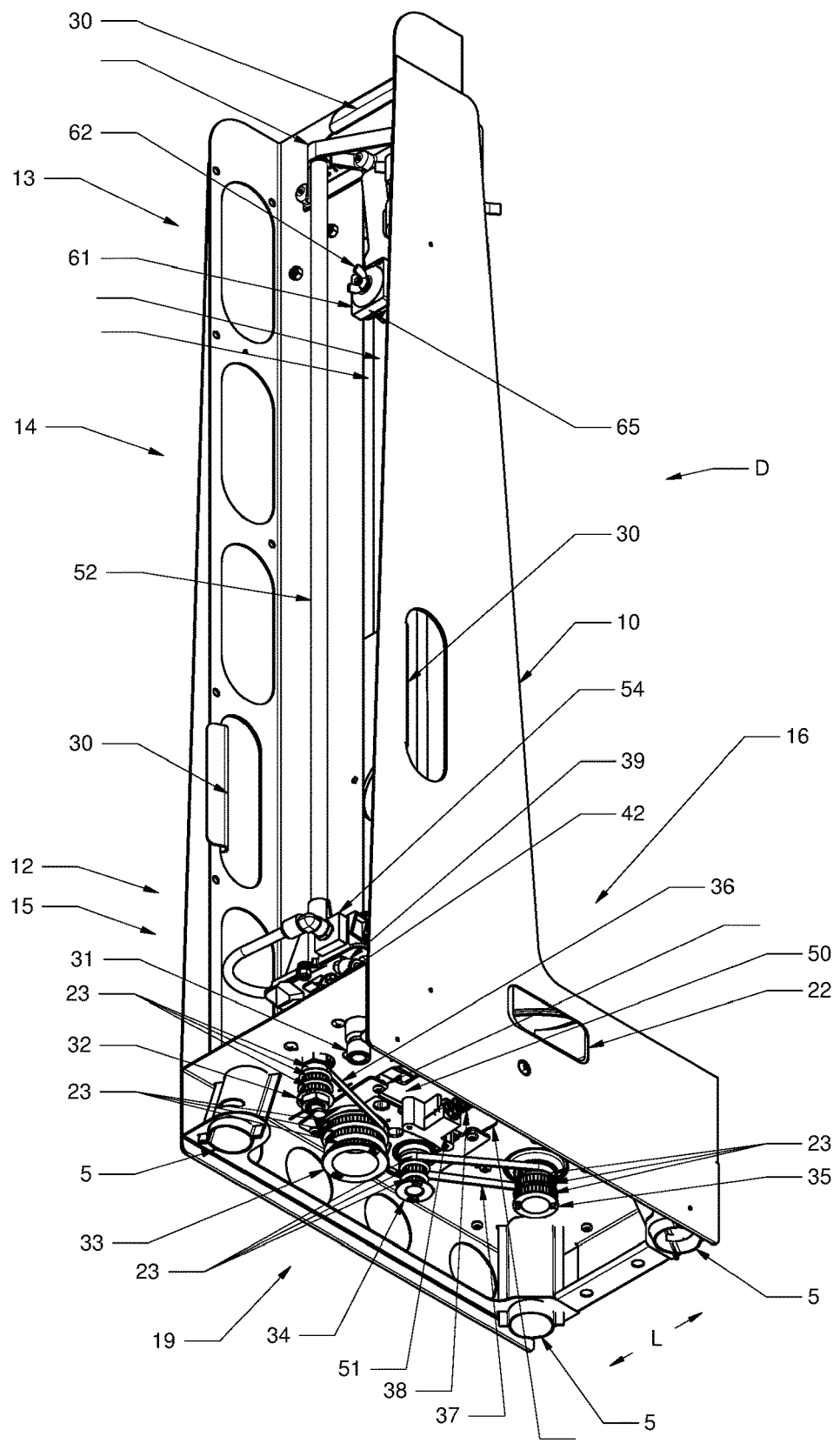
FIG. 11 is a perspective view of an embodiment of the present invention.

In a preferred embodiment, filter cartridge cleaning device D comprises a lead screw subassembly 14 (see FIGS. 1(a), 3(a), 7, and 11) comprising (i) a lead screw 52 with an upper (free) end and a lower (driven) end, (ii) a lead screw bearing holder 69 attached to and proximal the lower end of the lead screw 52, (iii) a lead screw bearing shield 70 positioned above and proximal the lead screw bearing holder 69 and attached to the lead screw 52, (iv) a lead screw driven pulley 32 (see also FIGS. 3(e) and 11) positioned below and proximal the lead screw bearing holder 69 and attached to the lead screw 52, and (v) a lead screw free end support 68 attached to the chassis 10 and proximal the upper end of the lead screw 52. Formed on the lead screw 52 along substantially its entire length are helical-shaped grooves (e.g., screw threads). The lead screw bearing holder 69 is attached to the chassis 10, thereby attaching the lower end of the lead screw subassembly 14 to the chassis 10.

The lead screw bearing holder 69 accommodates in its interior a bearing (not shown) which allows for free rotation of the lead screw 52 about the longitudinal axis of the lead screw 52 (depicted by the arrow R in FIG. 7). The lead screw bearing shield 70 is crafted to inhibit dirt and debris from fouling the bearing accommodated in the lead screw bearing holder 69. The lead screw free end support 68 is attached to the chassis 10 and holds the lead screw 52 in place to allow for free rotation of the lead screw 52 during cleaning operations.

In a preferred embodiment of the invention wherein vertical displacement of the spray subassembly 12 is effectuated by rotation of a lead screw 52, a lead screw belt and pulley system (see FIGS. 3(e) and 11) provides torque to effectuate the rotation of the lead screw 52 about its longitudinal axis (see direction of rotation R shown in FIG. 7), such lead screw belt and pulley system preferably comprised of a lead screw driven pulley 32 which is attached to and transmits torque to the lead screw 52 provided from a lead screw driving pulley 33 positioned on the power unit 19 by means of a lead screw drive belt 36 joined to each of the lead screw driven pulley 32 and the lead screw driving pulley 33. The force imparted to drive the lead screw driving pulley 33 of the power unit 19 is provided by a water stream fed to the power unit 19 of the device D via the start/stop valve 15.

One or more of the lead screw driven pulley 32 and the lead screw driving pulley 33 has one or more tiers 23, each tier having a different working diameter. The lead screw drive belt 36 of the lead screw belt and pulley system is looped onto one tier 23 of (i) the lead screw driven pulley 32 and (ii) the lead screw driving pulley 33. Variation of the tier 23 on one or more of the lead screw driven pulley 32 and the lead screw driving pulley 33 onto which the lead screw drive belt 36 is looped will vary the drive ratio of the lead screw belt and pulley system, yielding a particular operating speed tailored to different sizes of cartridges 1.

Figure 10B:
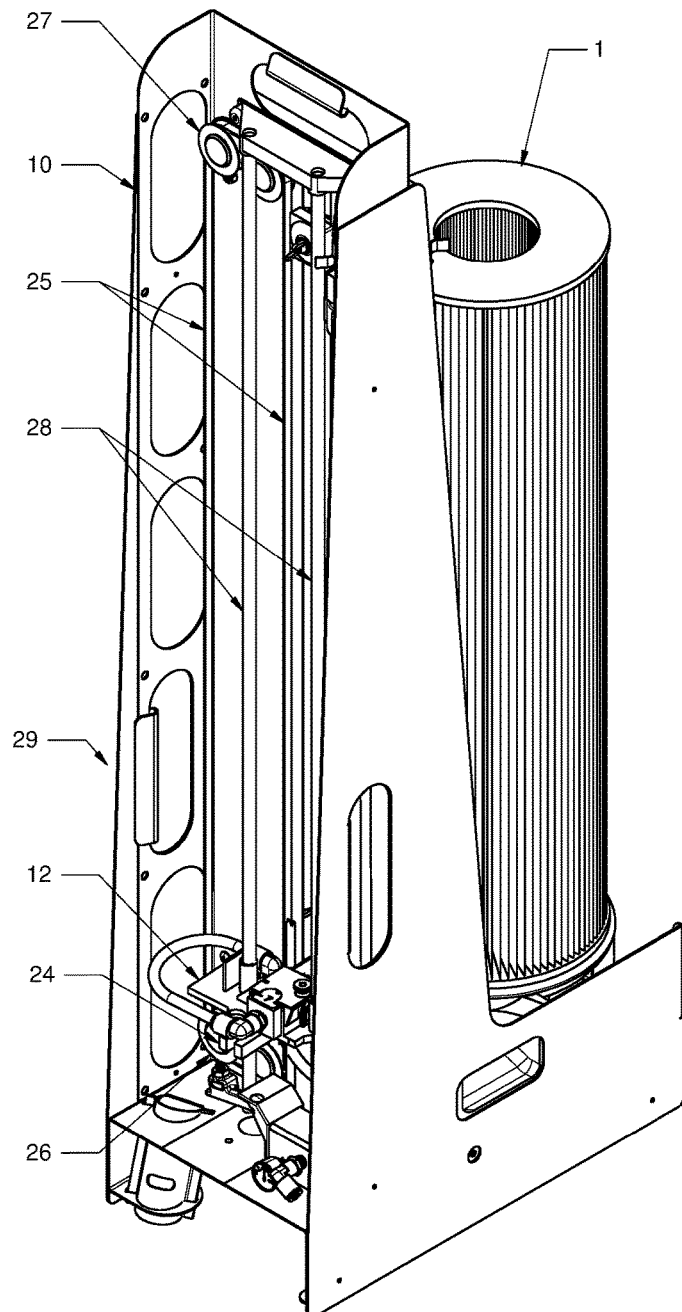

In a preferred embodiment and with reference to FIGS. 10(a) and 10(b), filter cartridge cleaning device D comprises a spray subassembly belt drive system 29 comprising (i) a carriage drive belt 25 looped around a driven pulley 26 and one or more idler pulleys 27, and (ii) a spray subassembly 12 that is joined to the carriage drive belt 25. The lateral motion of the spray subassembly 12 is constrained by a plurality of guide rods 28 spaced suitably apart to prevent rotation of the spray subassembly 12 about an axis parallel to the longitudinal axis of a cartridge 1 positioned on the rotatable spindle 72. Each guide rod 28 is oriented substantially parallel to the longitudinal axis of the filter 1 (see FIG. 10(b)). A clamping device 24 is attached to the spray subassembly 12 and separably engages with the carriage drive belt 25, with the clamping device 24 clamping the spray subassembly 12 to the carriage drive belt 25. Disengagement of the clamping device 24 from the carriage drive belt 25 allows for the spray subassembly 12 to be vertically displaceable upward toward the upper end of the chassis 10. The clamping device 24 is then re-engageable with the carriage drive belt 25 such that when the carriage drive belt 25 rotates as described herein, such rotation causes the vertical displacement downward of the spray subassembly 12.

The one or more power units 19 of the filter cartridge cleaning device D (shown in detail in FIGS. 3(e), 5(a), 5(b), and 11) is positioned over the opening O of the horizontal section of chassis 10 and wherein each power unit 19 is comprised of (i) a power unit chassis 50 which has positioned thereon a power unit fluid inlet port 45 and a power unit nozzle 46, (ii) a power wheel 47 rotatably secured to the power unit chassis 50 and rotatably connected to a plurality of compound gears 48 interposed between the power wheel 47 and the power unit chassis 50, (iii) in embodiments wherein torque transfer to one or more of the rotatable platform subassembly 16 and spray subassembly 12 via a belt and pulley system, a belt tensioning spring perch 51 positioned on the underside of the power unit chassis 50, and (iv) in embodiments of the present invention wherein vertical displacement of the spray subassembly 12 is effectuated by rotation of the lead screw 52 of the lead screw subassembly 14, a lead screw belt and pulley system. Preferably, the lead screw belt and pulley system comprises a lead screw driving pulley 33 rotatably attached to the power unit chassis 50 and a lead screw driven pulley 32 joined via the lead screw drive belt 36 to the lead screw driving pulley 33. Alternatively, in embodiments of the present invention wherein vertical displacement of the spray subassembly 12 is effectuated by a spray subassembly belt drive system 29 (FIGS. 10(a) and (b)), the power unit 19 comprises elements (i) through (iii) as set forth above, and further comprises a spray subassembly belt and pulley system. Preferably, the spray subassembly belt and pulley system comprises a driven pulley 26 and one or more idler pulleys 27 joined to the driven pulley 26 via the carriage drive belt 25.

Figures 2A, 2B:
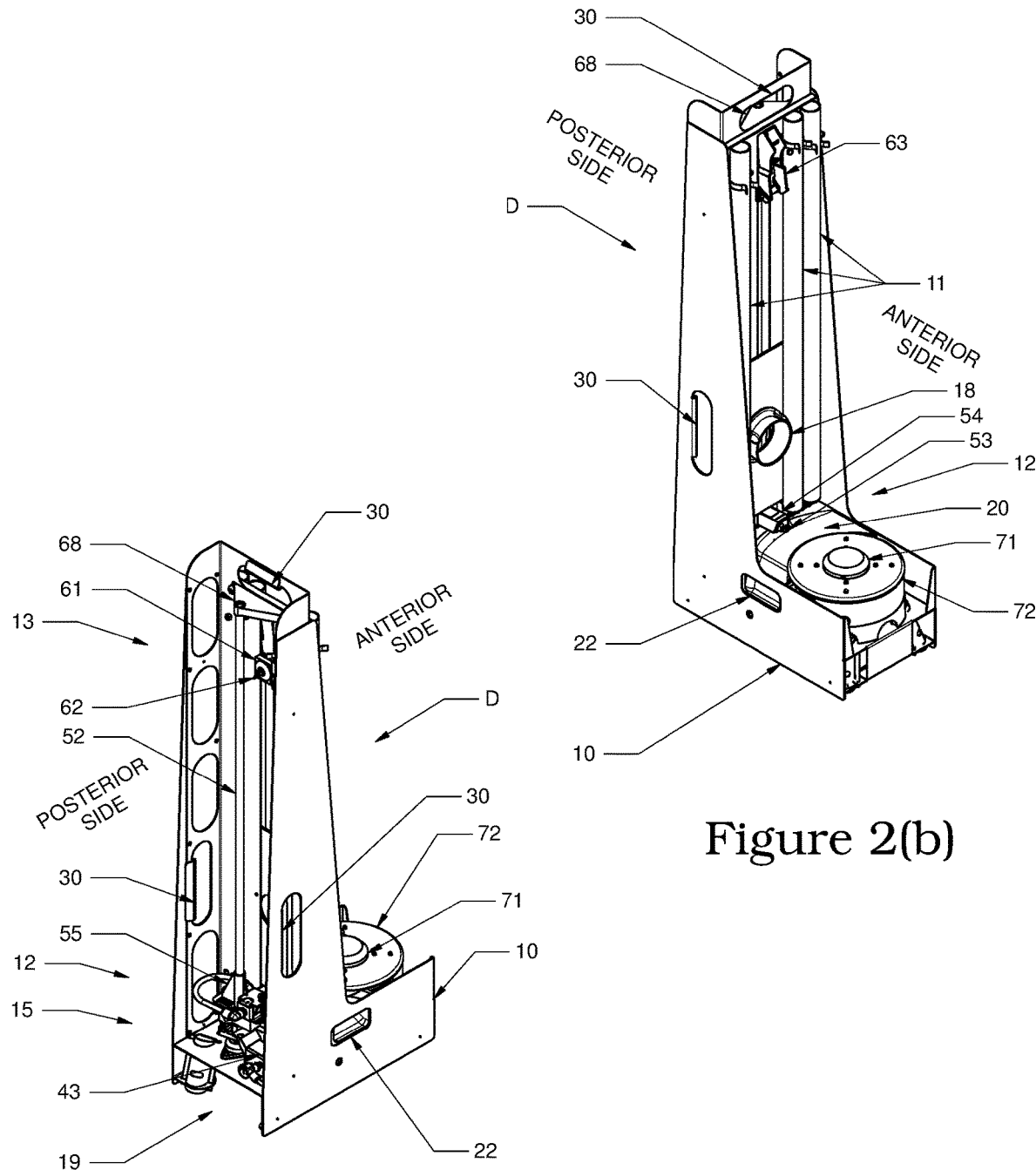
FIG. 2(*a*) is a perspective view of an embodiment of the present invention.

Preferably a power unit cover 20 (see FIGS. 2(b) and 3(a)) is located over the one or more power units 19. The power unit cover 20 is attached to the chassis 10 and configured to (i) inhibit dirt and debris from fouling the one or more power units 19 and (ii) collect fluid from the spray subassembly 12, along with dirt and debris dislodged during operation, and channel the flow of those materials out the discharge port 22.

In embodiments wherein vertical displacement of the spray subassembly 12 is effectuated by rotation of a lead screw 52, fluid supplied to the one or more power units 19 provides the force necessary to (i) rotate the lead screw 52 which effectuates the vertical displacement of the spray subassembly 12 which is in contact with the lead screw 52, and (ii) rotate the rotatable platform spindle 72 of the rotatable platform subassembly 16 and, by virtue of the cartridge 1 being positioned on the rotatable platform spindle 72, rotate the cartridge 1 during cleaning operations. Specifically, fluid is supplied to the one or more power units 19 from the start/stop valve 15, with water flowing out the power unit supply port 39 of the start/stop valve 15 and into a power unit fluid inlet port positioned on each power unit 19.

The power unit nozzle 46 of the power unit 19 is in fluid communication with the power unit fluid inlet port 45 and the fluid issuing from the power unit nozzle 46 impacts the power wheel 47, causing the power wheel 47 of the power unit 19 to rotate. The power wheel 47 of the power unit 19 has a rotatable gear (not shown) integrated with the power wheel 47 which is positioned below the power wheel 47 and is in rotatable contact with the plurality of compound gears 48 supported by the power unit chassis 50 which are interposed between the power unit chassis 50 and the power wheel 47. The rotation of the plurality of compound gears 48 of the power unit 19 modifies the rotational speed and torque produced by the power wheel 47. At least one gear from the plurality of compound gears 48 is rotatably joined to a lead screw driving pulley 33 and at least one gear from the plurality of compound gears 48 is rotatably joined to a rotatable platform driving pulley 34, with each of pulleys 33 and 34 positioned below the power unit chassis 50. The torque which is transferred from the power wheel 47 to the plurality of compound gears 48 is in turn transferred to the lead screw driving pulley 33 and the rotatable platform driving pulley 34, thereby actuating such pulleys 33 and 34. The actuation of the lead screw driving pulley 33 effectuates rotation of the lead screw 52, thereby effectuating vertical displacement of the spray subassembly 12. The actuation of the rotatable platform driving pulley 34 effectuates rotation of the rotatable platform spindle 72 of the rotatable platform subassembly 16, allowing for the rotation of the cartridge 1 to be cleaned during cleaning operations when such cartridge 1 is positioned on the rotatable platform spindle 72.

In an alternative embodiment, cleaning device D comprises a first power unit 19a and a second power unit 19b, with (i) the first power unit 19a providing the force necessary to rotate the lead screw 52 which effectuates the vertical displacement of the spray subassembly 12 which is in contact with the lead screw 52, with such first power unit 19a in fluid communication with the start/stop valve 15 and comprising a first power unit throttling valve 67a, a first power unit nozzle 46a, and a first power unit power wheel 47a in rotatable contact with a plurality of first power unit compound gears 68a, wherein at least one first power unit compound gear 68a is rotatably attached to a lead screw driving pulley 33 joined via a lead screw drive belt 36 with the lead screw driven pulley 32; and (ii) the second power unit 19b providing the force necessary to rotate the rotatable platform spindle 72 of the rotatable platform subassembly 16 and, by virtue of the cartridge 1 being positioned on the rotatable platform spindle 72, rotate the cartridge 1 during cleaning operations, with such second power unit 19b in fluid communication with the start/stop valve 15 and comprising a second power unit throttling valve 67*b*, a second power unit nozzle 46*b*, and a second power unit power wheel 47*b* in rotatable contact with a plurality of second power unit compound gears 68*b*, wherein at least one second power unit compound gear 68*b* is rotatably attached to a rotatable platform driving pulley 34 joined via a rotatable platform drive belt 37 with the rotatable platform driven pulley 35. Fluid from the start/stop valve 15 is directed to the first power unit 19*a* via the first power unit fluid inlet port 45*a* and through the first power unit throttling valve 67*a* and wherein fluid is emitted from the first power unit nozzle 46*a* toward the first power unit power wheel 47*a* causing rotation of the first power unit power wheel 47*a* and wherein the torque from the rotating first power unit power wheel 47*a* is transferred to the lead screw driving pulley 33 through the plurality of first power unit compound gears 68*a*. Fluid from the start/stop valve 15 is directed to the second power unit 19*b* via the second power unit fluid inlet port 45*b* and through the second power unit throttling valve 67*b* and wherein fluid is emitted from the second power unit nozzle 46*b* toward the second power unit power wheel 47*b* causing rotation of the second power unit power wheel 47*b* and wherein the torque from the rotating second power unit power wheel 47*b* is transferred to the rotatable platform driving pulley 34 through the plurality of second power unit compound gears 68*b*.

In embodiments wherein vertical displacement of the spray subassembly 12 is effectuated by a spray subassembly belt drive system 29 (FIGS. 10(*a*) and (*b*)), fluid supplied to the power unit 19 provides the force necessary to effectuate the vertical displacement of the spray subassembly 12 and rotate the rotatable platform spindle 72 of the rotatable platform subassembly 16 and, by virtue of the cartridge 1 being positioned on the rotatable platform spindle 72, rotate the cartridge 1 during cleaning operations. Specifically, fluid is supplied to the power unit 19 from the start/stop valve 15, with water flowing out the power unit supply port 39 of the start/stop valve 15 and into the power unit fluid inlet port 45 of the power unit 19. The power unit nozzle 46 of the power unit 19 is in fluid communication with the power unit fluid inlet port 45 and the fluid issuing from the power unit nozzle 46 impacts the power wheel 47 which is rotatably secured to the power unit chassis 50 and rotatably connected to a plurality of compound gears 48 interposed between the power wheel 47 and the power unit chassis 50. At least one gear from the plurality of compound gears 48 is rotatably attached to a spray subassembly belt and pulley system, such system preferably comprising a driven pulley 26, one or more idler pulleys 27, and carriage drive belt 25 joining pulleys 26 and 27. Carriage drive belt 25 is continuous and looped over the driven pulley 26 and the one or more idler pulleys 27 and is rotatable about pulleys 26 and 27 in a direction M (FIG. 10(*a*)) toward the top of the chassis 10 and a direction N (FIG. 10(*b*)) toward the bottom of the chassis 10. The torque of the rotation of the driven pulley 26 is transferred to the one or more idler pulleys 27 via rotation of the carriage drive belt 25. The spray subassembly 12 is joined to the carriage drive belt 25, with the carriage drive belt 25 looped through a portion of the spray subassembly 12 such that the rotation of the carriage drive belt 25 causes the spray subassembly 12 to be vertically displaced. As such, rotation of the power wheel 47 causes rotation of the plurality of compound gears 48, and rotation of at least one of the compound gears 48 causes rotation of the driven pulley 26 which in turn causes rotation of the carriage drive belt 25 and vertical displacement of the spray subassembly 12.

In embodiments of the cleaning device D comprising a rotatable platform belt and pulley system and a lead screw belt and pulley system wherein device D has one power unit 19, extending through the opening O in the chassis 10 proximal the power unit chassis 50 of the power unit 19 is a flanged power unit keeper 49 (see FIGS. 5(*a*) and 5(*b*) and 11) attached to the power unit chassis 50. The flanged power unit keeper 49 allows the power unit 19 of the filter cartridge cleaning device D to be positioned at one of a plurality of different horizontal positions within the opening O in the chassis 10 to thereby accommodate (i) a lead screw drive belt 36 looped over a tier 23 on the lead screw driving pulley 33 and lead screw driven pulley 32 and (ii) a rotatable platform drive belt 37 looped over a tier 23 on the rotatable platform driving pulley 34 and the rotatable platform driven pulley 35, thus affording optimized cleaning of different diameter cartridges 1.

Protruding from and attached to the belt tensioning spring perch 51 attached to the power unit 19 is a drive belt tensioning spring 38. The drive belt tension spring 38 provides a force to laterally move the power unit 19 in direction L, as indicated by the arrow shown on FIG. 11, into a lateral position which simultaneously tightens both the lead screw drive belt 36 and the rotatable platform drive belt 37 (see FIGS. 3(*e*) and 11) to a suitable working tension. The rotatable platform driving pulley 34, the rotatable platform driven pulley 35, and the rotatable platform drive belt 37 which joins the rotatable platform driving pulley 34 to the rotatable platform driven pulley 35 comprise a rotatable platform belt and pulley system which effectuates rotation of the rotatable platform spindle 72 of the rotatable platform subassembly 16.

In a preferred embodiment, the rotatable platform driving pulley 34 and the rotatable platform driven pulley 35 of the rotatable platform belt and pulley system has one or more tiers 23 (see FIGS. 5(*a*), 5(*b*), and 11), and, in embodiments wherein one or more of the pulleys 34 and 35 has more than one tier 23, each such tier 23 has a unique working diameter. The rotatable platform drive belt 37 of the rotatable platform belt and pulley system is looped onto one tier 23 on the rotatable platform driving pulley 34 and one tier 23 on the rotatable platform driven pulley 35. In a preferred embodiment, each of pulleys 32, 33, 34 and 35 has three tiers 23 and the positioning of the corresponding drive belt (rotatable platform drive belt 37 on pulleys 34 and 35 and lead screw drive belt 36 on pulleys 32 and 33 in embodiments where vertical displacement of the spray subassembly 12 is effectuated by rotation of a lead screw 52) in different tiers provides for different drive ratios for the rotatable platform subassembly 16 and the lead screw 52, respectively, affording operating speeds tailored to different sizes of cartridges 1.

Figure 14:
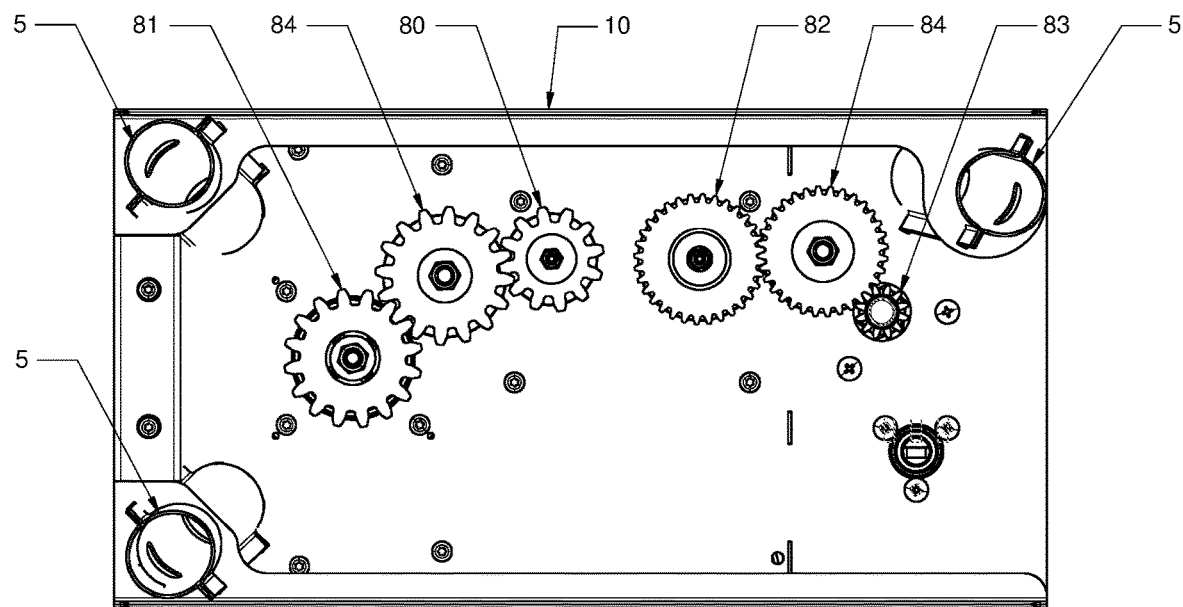
FIG. 14 is a plan view of various elements comprising an embodiment of the present invention viewed from below.

In alternative preferred embodiments of the cleaning device D wherein the vertical displacement of the spray subassembly 12 is effectuated by rotation of the lead screw 52 and cleaning device D comprises either one power unit 19 or two power units 19*a* and 19*b*, the rotation of the lead screw 52 and rotatable platform spindle 72 of the rotatable platform subassembly 16 is effectuated by a system of rotatably connected gears. In such embodiments and with reference to FIG. 14, rotatably attached to the power unit chassis 50 of each power unit 19 is (i) a lead screw driving gear 82, (ii) a rotatable platform driving gear 80, and (iii) one or more idler gears 84. Each power unit 19 is fixed in position to the chassis 10 of the cleaning device D. A lead screw driven gear 83 is positioned below and proximal the lead screw bearing holder 69 and attached to the lead screw 52. A rotatable platform driven gear 81 is positioned below and attached to the rotatable platform spindle 72 wherein rotation of the rotatable platform driven gear 81 causes rotation of the rotatable platform spindle 72. At least one compound gear 48 is rotatably attached to the lead screw driving gear 82 and at least one other compound gear 48 is rotatably attached to the rotatable platform driving gear 80. Fluid is emitted from the power unit nozzle 46 toward the power wheel 47 causing rotation of the power wheel 47. Torque from the rotating power wheel 47 is transferred to (i) the lead screw driving gear 82 via the one or more compound gears 48 rotatably attached to the lead screw driving gear 82 and in rotatable contact with the power wheel 47, (ii) then to the one or more idler gears 84 attached to the power unit chassis 50 of each power unit 19, and (iii) then to the lead screw driven gear 83 thereby effectuating rotation of the lead screw 52 and vertical displacement of the spray subassembly 12 as described herein. Further, the torque from the rotating power wheel 47 is transferred to (i) the rotatable platform driving gear 80 via the one or more compound gears 48 rotatably attached to the rotatable platform driving gear 80 and in rotatable contact with the power wheel 47, (ii) then to the one or more idler gears 84, and (iii) then to the rotatable platform driven gear 81 thereby effectuating rotation of the rotatable platform spindle 72 of the rotatable platform subassembly 16.

In alternative preferred embodiments of the cleaning device D wherein the vertical displacement of the spray subassembly 12 is effectuated by a spray subassembly belt drive system 29, the rotation of the rotatable platform spindle 72 of the rotatable platform subassembly 16 is effectuated by a system of rotatably connected gears. In such embodiments, fluid impacts the power wheel 47 rotatably secured to the power unit chassis 50 and rotatably connected to a plurality of compound gears 48 interposed between the power wheel 47 and the power unit chassis 50, causing rotation of the power wheel 47 and the plurality of compound gears 48. At least one compound gear 48 is rotatably attached to a driven pulley 26 such that rotation of the power wheel 47 causes rotation of the driven pulley 26. At least one gear from the plurality of compound gears 48 is rotatably attached to the driving gear 80, and one or more idler gears 84 is rotatably attached to the chassis 10. Torque from the rotatable platform driving gear 80 is transferred to the one or more idler gears 84 which in turn transfers torque to the rotatable platform driven gear 81 effectuating rotation of the rotatable platform spindle 72.

The rotatable platform subassembly 16 is comprised of (i) a rotatable platform spindle 72, (ii) a rotatable platform bearing shield 74 positioned below and attached to the rotatable platform spindle 72, (iii) a rotatable platform bearing housing 73 positioned below the rotatable platform bearing shield 74, and (iv) in embodiments wherein torque is transferred from the power wheel 47 to the rotatable platform spindle 72 via a rotatable platform belt and pulley system, a rotatable platform driven pulley 35 positioned below and attached to the rotatable platform spindle 72 wherein rotation of the rotatable platform driven pulley 35 causes rotation of the rotatable platform spindle 72. Alternatively, in embodiments wherein torque is transferred from the power wheel 47 to the rotatable platform spindle 72 via a system of connected gears, the rotatable platform subassembly 16 is comprised of (i) through (iii) above, plus a rotatable platform driven gear 81 is positioned below and attached to the rotatable platform spindle 72 wherein rotation of the rotatable platform driven gear 81 causes rotation of the rotatable platform spindle 72. The rotatable platform bearing housing 73 is attached to the chassis 10 and has disposed therein one or more bearings (not depicted) which support and allow for rotation of the rotatable platform spindle 72. The rotatable platform bearing shield 74 is crafted to inhibit dirt and debris from fouling the one or more bearings disposed inside the rotatable platform bearing housing 73.

The rotatable platform spindle 72 of the rotatable platform subassembly 16 supports a cartridge 1 positioned on the upper surface of the rotatable platform spindle 72 during a cleaning cycle. In embodiments wherein torque is transferred from the power wheel 47 to the rotatable platform spindle 72 via a rotatable platform belt and pulley system, the rotatable platform driven pulley 35 is attached to and transmits torque to the rotatable platform spindle 72 from the rotatable platform driving pulley 34 on the power unit 19 by means of a rotatable platform drive belt 37. Each of the rotatable platform driven pulley 35 and the rotatable platform driving pulley 34 has one or more tiers 23. Variation of the tier 23 on one or more of the rotatable platform driving pulley 34 and the rotatable platform driven pulley 35 onto which the rotatable platform drive belt 37 is looped will vary the drive ratio of the rotatable platform belt and pulley system, yielding a particular operating speed tailored to different diameter cartridges 1.

In embodiments wherein torque is transferred from the power wheel 47 to the rotatable platform spindle 72 via a system of rotatable connected gears, torque is transferred as described earlier herein to the rotatable platform driving pulley 80, then to the one or more idler gears 84, and then to the rotatable platform driven pulley 81 which effectuates rotation of the rotatable platform spindle 72.

In a preferred embodiment of the invention, disposed on the center of the upper surface of the rotatable platform spindle 72 is a rotatable platform protrusion 71 (see FIGS. 2(a) and 2(b)), with such protrusion 71 accommodated in the annular void space on one of the two planar ends of the cartridge 1 during cleaning operations. The rotatable platform protrusion 71 aids in centering a cartridge 1 on the upper surface of the rotatable platform spindle 72 during cleaning operations. For certain filters, the diameter of the protrusion 71 approximates the diameter of the annular void space on the planar end of a cartridge 1 to be cleaned. Certain cartridges 1 having larger diameter annular void spaces along their longitudinal axis and, in a preferred embodiment, are accommodated by a plurality of cylindrical elements 75 disposed through vertical cylindrical holes in the upper surface of the rotatable platform spindle 72. The locations of said cylindrical elements 75 are arranged so that the diameters of the cylindrical elements 75 (i) are less than the plurality of diameters representative of the larger diameters of the annular void space of certain cartridges 1 and (ii) are concentric with the vertical axis of the rotatable platform spindle 72. Each of the cylindrical elements 75 is free to move along the axis of the vertical cylindrical hole in the rotatable platform spindle 72 in which it is disposed and each cylindrical element 75 is located along its vertical axis by a respective spring 76 tending to position the upper end of each cylindrical element 75 a certain distance above the upper surface of the rotatable platform spindle 72. When a cartridge 1 is placed on the rotatable platform spindle 72 any cylindrical elements 75 not accommodated within the annular void space of the cartridge 1 will be displaced downward by the weight of the cartridge 1 and will deflect the spring 76. When said cartridge 1 is removed from the upper surface of the rotatable platform 72, any cylindrical element 75 displaced downward by the weight of the filter 1 will be displaced upward to its original position by its respective spring 76. A plurality of cartridges 1 with various annular void space diameters may thus be conveniently centered on the rotatable platform spindle 72.

Figure 8A:
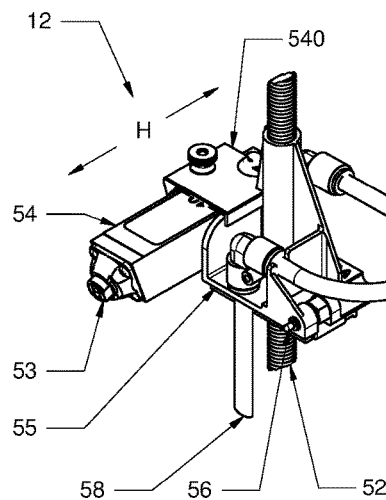
FIG. 8(*a*) is a perspective view of the nozzle array subassembly according to an embodiment of the present invention.
Figure 8B:
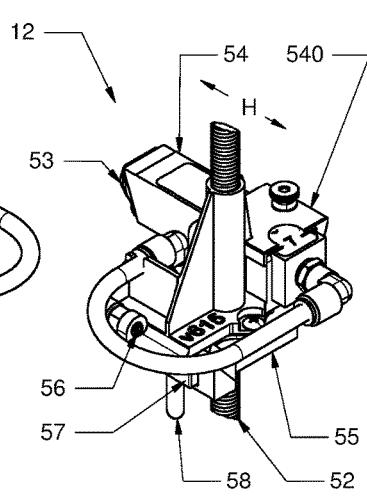
Figure 8C:
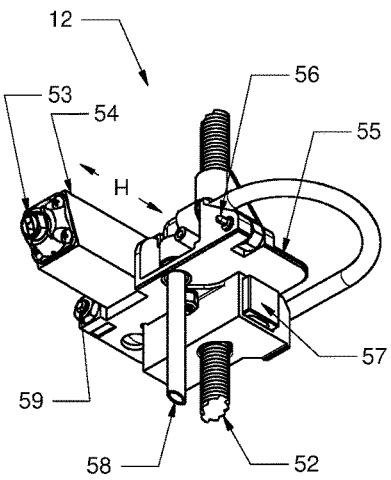
Figure 15A:
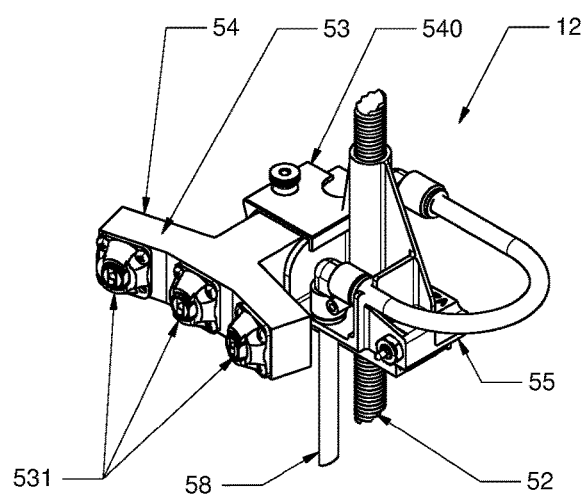
FIG. 15(*a*) is a perspective view of the spray subassembly according to an embodiment of the present invention.
Figure 15B:
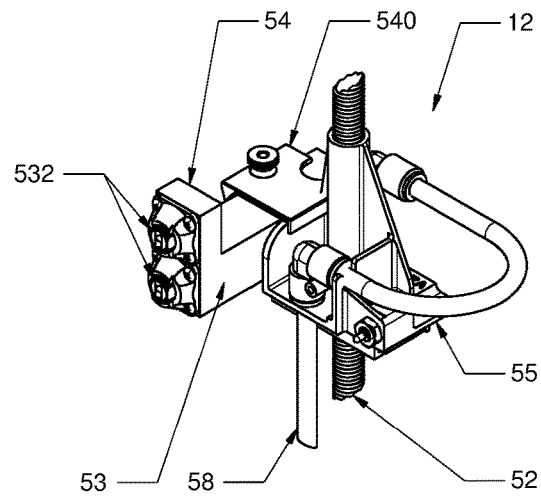
Figure 16:
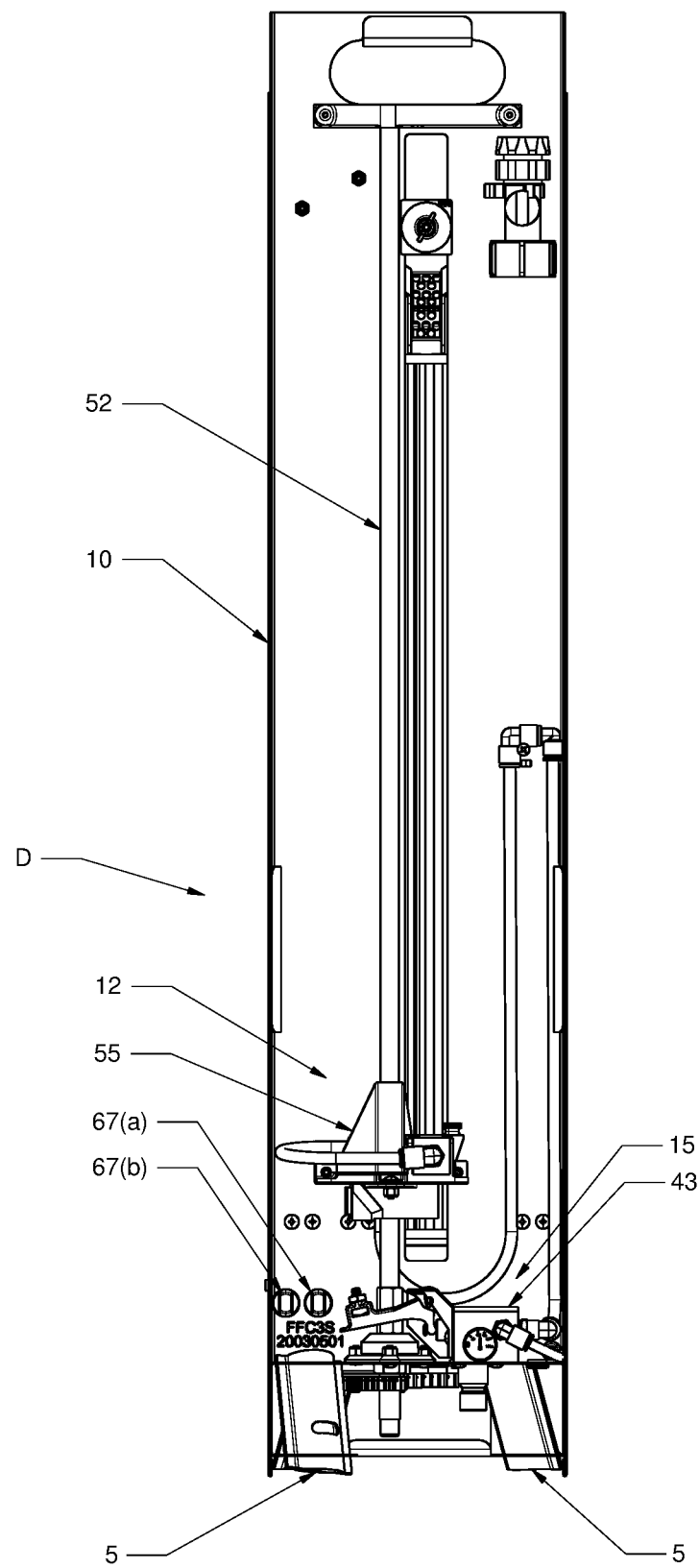
FIG. 16 is an elevation view of an embodiment of the present invention.
Figure 17A:
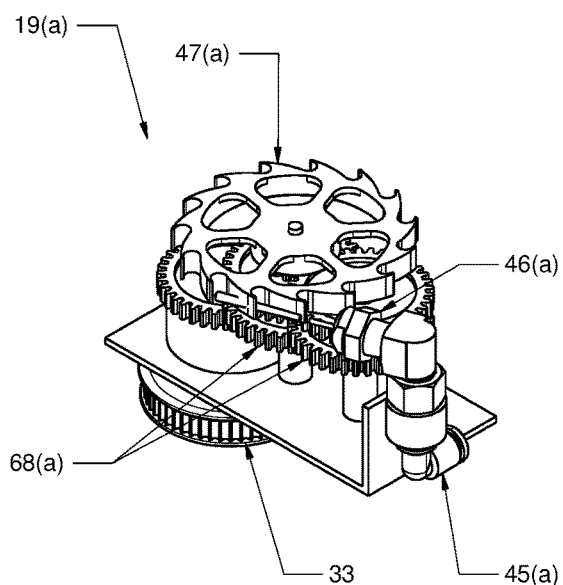
FIG. 17(*a*) is a perspective view of a power unit according to an embodiment of the present invention.
Figure 17B:
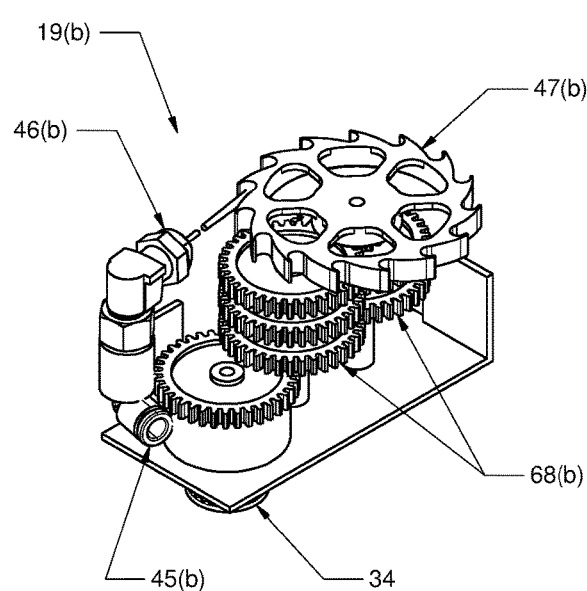
Figure 18:
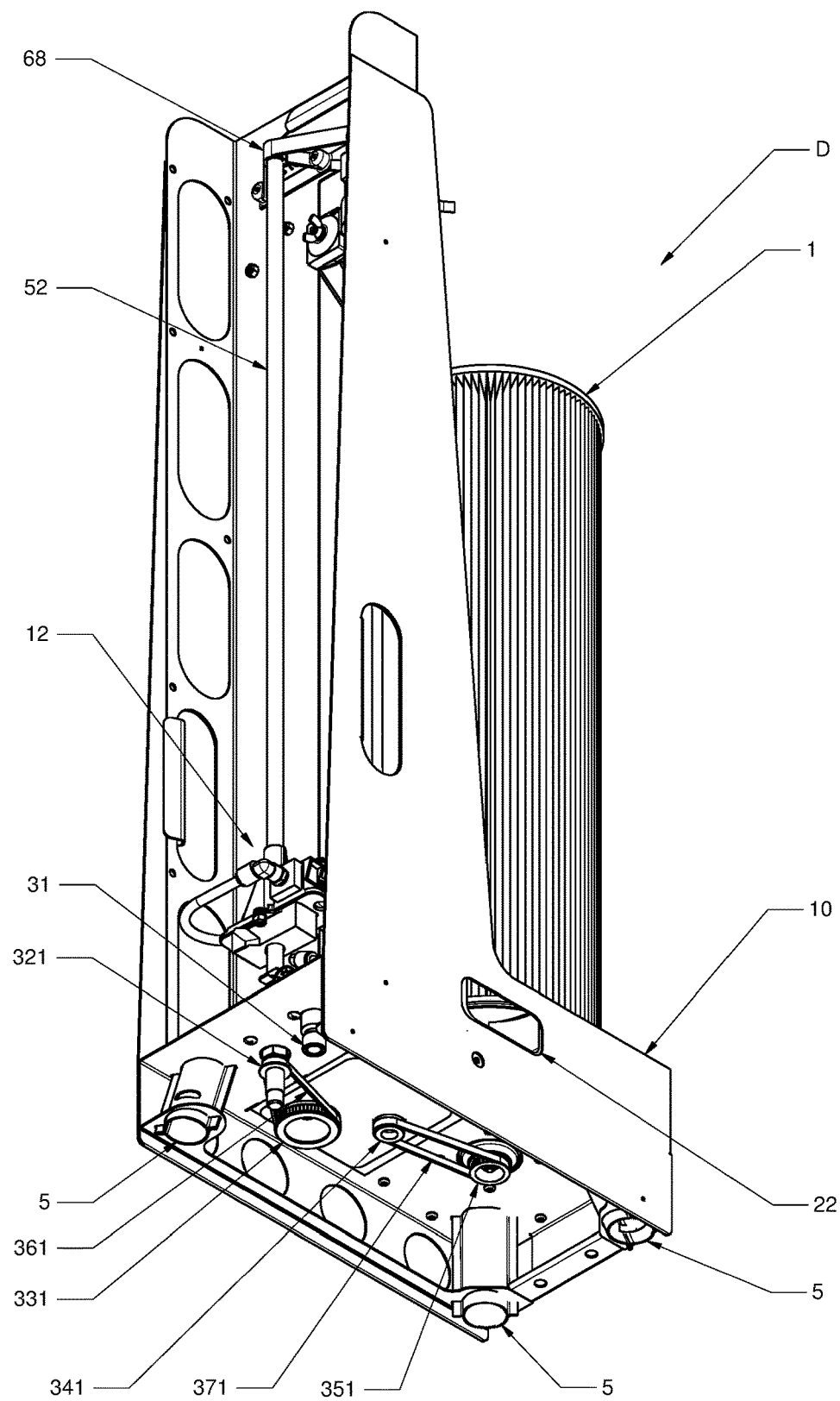
FIG. 18 is a perspective view of an embodiment of the present invention.
Figure 19:
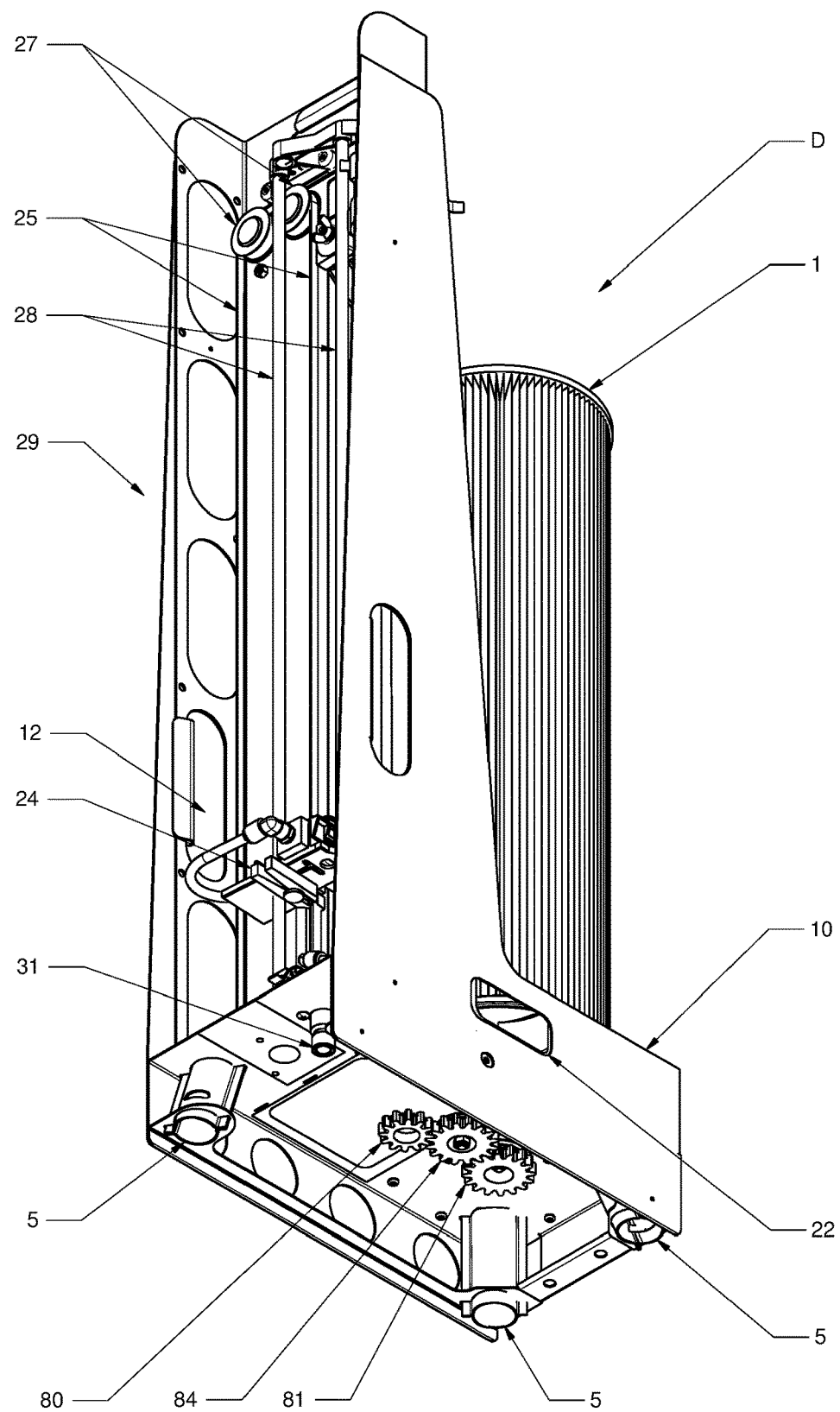
FIG. 19 is a perspective view of an embodiment of the present invention.

In an embodiment of the invention, the cleaning device D comprises a spray subassembly 12 (see, e.g., FIGS. 8(a), 8(b), 8(c), 12, 15(a), and 15(b)) comprising a nozzle carriage 55 and a movable nozzle holder 54 securable to the nozzle carriage 55 by one or more securing devices 540 and to which is attached a nozzle array 53, such nozzle array 53 comprised of one or more nozzles. In a preferred embodiment, nozzle array 53 comprises one nozzle as shown in FIGS. 8(a), 8(b), and 8(c). In an alternative preferred embodiment, nozzle array 53 comprises a plurality of nozzles as shown in FIG. 15(a)(wherein nozzle array 53 comprises three nozzles 531) and FIG. 15(b) (wherein nozzle array 53 comprises two nozzles 532). The nozzle array 53 is in fluid communication with the spray subassembly fluid inlet 58 secured to the nozzle carriage 55 which is in turn in fluid communication with the spray subassembly supply port 40 of the start/stop valve 15. The movable nozzle holder 54 is securable to the nozzle carriage 55 in a manner to allow the movable nozzle holder 54 a single direction of movement, indicated by the directional arrow H, and may be positioned anywhere along the direction of movement such that the nozzle array 53 is located at the optimum distance, determined by the user, from the surface of the cartridge 1 to be cleaned. In a preferred embodiment, the movable nozzle holder 54 is securable to the nozzle carriage 55 using one or more clamps 540.

In preferred embodiments of the cleaning device D wherein vertical displacement of the spray subassembly 12 is effectuated by rotation of the lead screw 52, attached to the nozzle carriage 55 is a lead screw follower housing 551 (see FIG. 12) which (i) has positioned therein a hollow chamber 590 and (ii) is comprised of an anterior surface and an open posterior, an upper and a lower surface each extending between the anterior surface and the open posterior, and two lateral surfaces extending between the upper and lower surfaces. The lead screw follower housing 551 is closed at its anterior by its anterior surface and open at its posterior. Positioned on each of the upper and lower surfaces of the lead screw follower housing 551 is an aperture 552 through which is passable the lead screw 52. A lead screw follower 57 (shown in FIG. 13) is inserted into the hollow chamber 590 of the lead screw follower housing 551. The lead screw follower 57 comprises a parallelepiped comprised of an anterior surface proximal an anterior section of the lead screw follower 57, a posterior surface proximal a posterior section of the lead screw follower 57, an upper surface and a lower surface each extending between the anterior surface and the posterior surface, and a first and a second lateral surface each extending between the upper surface and the lower surface and between the anterior surface and the posterior surface. A void space 570 in the lead screw follower 57 extending from the upper surface to the lower surface of the lead screw follower 57 is positioned proximal the posterior surface of the lead screw follower 57 and extends from the posterior section of the lead screw follower 57 toward the center of the lead screw follower 57. The anterior surface of the void space 570 has formed thereon grooves 595 (e.g. screw threads) that are mateable with the grooves of the lead screw 52. Formed at the anterior section of the lead screw follower 57 and extending from the anterior surface of the lead screw follower 57 toward the center of the lead screw follower 57 is a lead screw follower spring chamber 575 comprising an approximately cylindrical void space into which is accommodated a lead screw follower spring 580, with the posterior end of the lead screw follower spring 580 secured to the lead screw follower 57 and the anterior (free) end of the lead screw follower spring 580 engageable with the anterior surface of the lead screw follower housing 551 when the lead screw follower 57 is inserted into the hollow chamber 590 of the lead screw follower housing 551.

Figure 12:
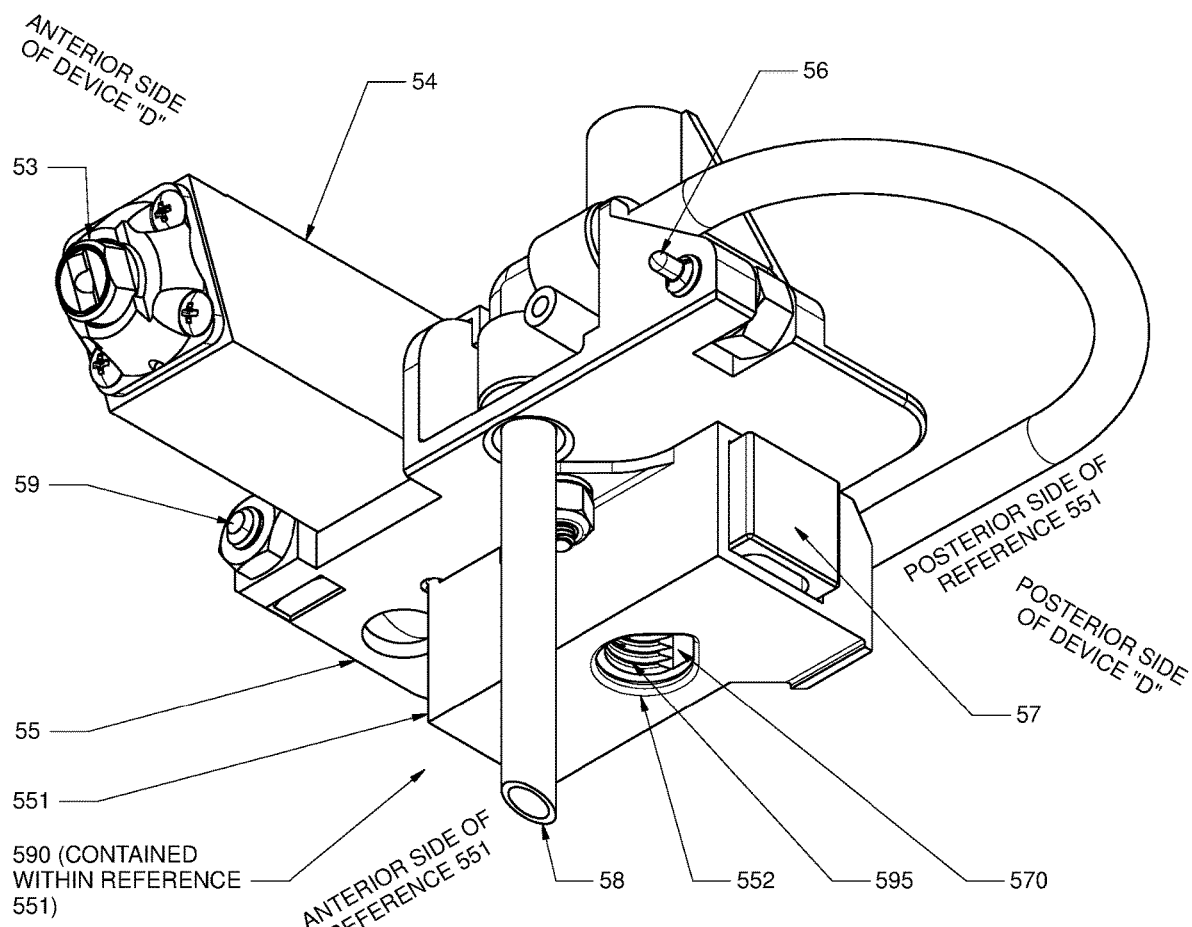
FIG. 12 is a perspective view of the spray subassembly according to an embodiment of the present invention.
Figure 13:
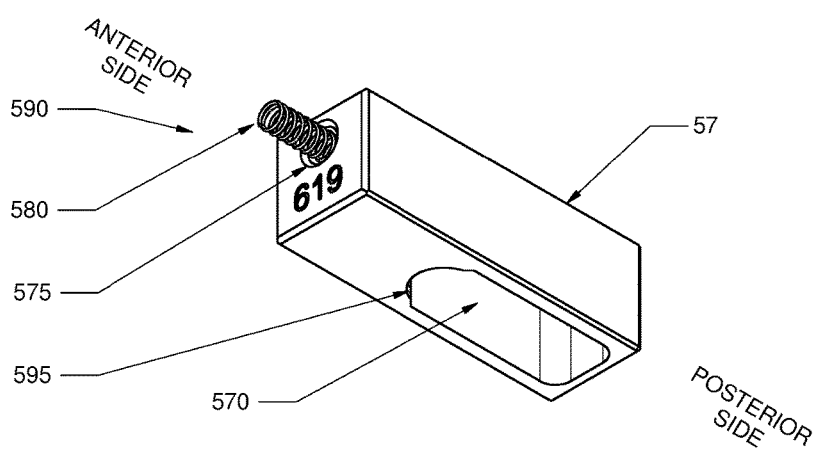
FIG. 13 is a perspective view of certain components of the spray subassembly according to an embodiment of the present invention.

With reference to FIGS. 12 and 13, the lead screw follower 57 is inserted into the hollow chamber 590 of the lead screw follower housing 551 by introducing the anterior section of the lead screw follower 57 into the hollow chamber 590 so that the void space 570 of the lead screw follower 57 is positioned (i) below the upper aperture (not shown) of the lead screw follower housing 551 and (ii) above the lower aperture 552 of the lead screw follower housing 551. The lead screw 52 passes through the lead screw follower housing 551 attached to the nozzle carriage 55 by being passed through the upper aperture (not shown) of the lead screw follower housing 551 (see FIG. 13) downward through the lower aperture 552 of the lead screw follower housing 551. By the lead screw 52 being so passed through the lead screw follower housing 551, the grooves of the lead screw 52 mateably engage with the grooves 595 formed on the anterior surface of the void space 570 of the lead screw follower 57. Such mateable engagement of the grooves of the lead screw 52 to the grooves formed on the lead screw follower 57 allow the lead screw 52 to effectuate motion of the nozzle carriage 55 when the lead screw 52 is rotated.

The lead screw follower spring 580 attached to the lead screw follower 57, which is pressed against the anterior surface of the lead screw follower housing 551 attached to the nozzle carriage 55 of the spray subassembly 12, provides a force to maintain the grooved mateable contact between the lead screw follower 57 and the lead screw 52, thereby preventing free movement of the nozzle carriage 55 along the longitudinal axis of the lead screw 52 and allowing rotation of the lead screw 52 to move the nozzle carriage 55 along the longitudinal axis of the lead screw 52 in a controlled motion. Overcoming the force of the lead screw follower spring 580 acting between the lead screw follower 57 and the lead screw follower housing 551 displaces the lead screw follower 57 distal the lead screw 52 and toward the anterior of the lead screw follower housing 551, thereby disengaging the grooved surface 595 at the anterior of the void space 570 of the lead screw follower 57 from the grooved surface of the lead screw 52, allowing free vertical displacement of the spray subassembly 12 along the longitudinal axis of the lead screw 52 facilitating rapid re-positioning of the spray subassembly 12 along its vertical direction of movement ranging from the upper end to the lower end of the lead screw 52.

Fluid issuing from the nozzle array 53 of the spray subassembly 12 will cause a moment tending to rotate the spray subassembly 12 about the longitudinal axis of the lead screw 52 in a clockwise direction as viewed from the lead screw free end support 68. This rotation is counteracted by a spring loaded device 56 which is (i) attached to the nozzle carriage 55, (ii) distal the nozzle array 53, and (iii) is in contact with the chassis 10, thereby providing a moment tending to rotate the spray subassembly 12 about the longitudinal axis of the lead screw 52 in a counter-clockwise direction as viewed from the lead screw free end support 68. The counter-clockwise moment created by the spring loaded device 56 on the nozzle carriage 55 of the spray subassembly 12 acting against the chassis 10 is greater than the clockwise moment created by the fluid issuing from the nozzle array 53 of the spray subassembly 12. As a result, the spray subassembly 12 does not rotate in a clockwise direction as viewed from the lead screw free end support 68 about the longitudinal axis of the lead screw 52 during cleaning operations, allowing for the fluid stream emitted from the nozzle array 53 to be generally directed toward the cartridge 1.

Further, with reference to FIG. 8(*c*), the nozzle carriage 55 has positioned thereon proximal the nozzle array 53 a movable stop 59 which contacts the chassis 10, thereby further limiting the rotation of the nozzle carriage 55 in a counter-clockwise direction about the lead screw 52 as viewed from the lead screw free end support 68 during cleaning operations when a fluid stream is emitted from the nozzle array 53. Positioning of this movable stop 59 controls the angle at which the spray emitted from the nozzle array 53 impacts the surface of the cartridge 1 and the moment created by the spring loaded device 56 insures constant contact between the chassis 10 and the movable stop 59 on the nozzle carriage 55 and a consistent angle at which the spray emitted from the nozzle array 53 impacts the surface of the cartridge 1 during a cleaning cycle.

Figure 9A:
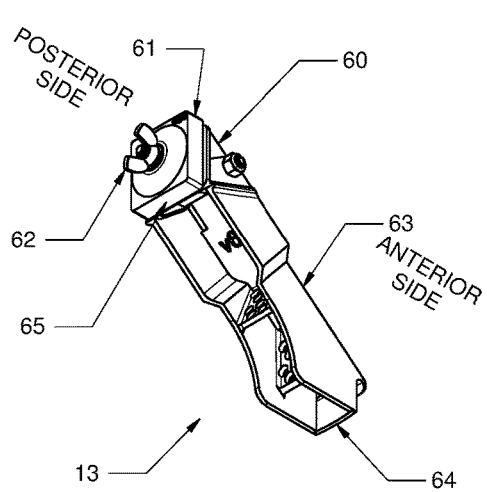
FIG. 9(*a*) is a perspective view of the up-stop subassembly according to an embodiment of the present invention.
Figure 9B:
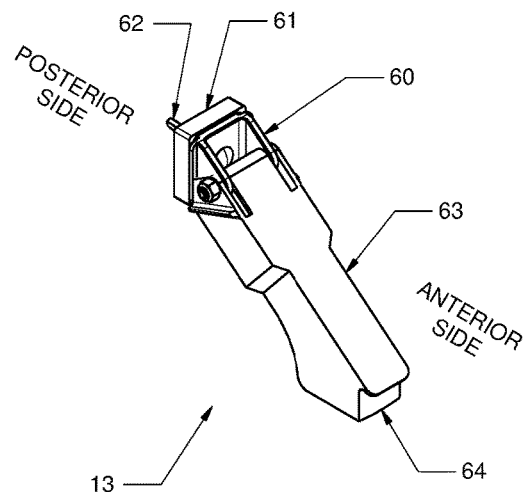

With reference to FIGS. 1(*a*), 1(*b*). 2(*a*), 3(*b*), 3(*d*), 9(*a*), and 9(*b*), in a preferred embodiment of cartridge cleaning device D, a movable up-stop subassembly 13 is provided to facilitate an operator correctly positioning the spray subassembly 12 for the start of the cartridge cleaning process. The up-stop subassembly 13 is attached to the chassis 10 of device D and is comprised of (i) an up-stop body 60, (ii) an up-stop clamp 61 with an anterior side and a posterior side (see FIGS. 9(*a*) and 9(*b*)) wherein such clamp 61 is attached to the up-stop body 60 and has a registration surface 65 on its underside, and (iii) a diffuser 63 with an anterior and a posterior end that is attached to the up-stop body 60 at its posterior end and has positioned on its anterior end a gaging surface 64. The up-stop body 60 is crafted to be in contact with the chassis 10 and have its orientation and direction of movement constrained substantially parallel to the direction of movement of the nozzle array sub-assembly 12 consisting of vertical displacement between a lower position proximal the horizontal section of the chassis 10 and an upper position distal the horizontal section of the chassis 10 and proximal the upper end of the vertical section of the chassis 10.

The up-stop subassembly 13 is secured to the chassis 10 of device D by positioning the posterior of the up-stop assembly 13 through the gap G in the vertical section of the chassis 10 and clamping the up-stop assembly 13 to the chassis 10. In a preferred embodiment, the up-stop clamp 61 is positioned through the gap G such that the posterior of the up-stop body 60 is positioned on one (posterior) side of the gap G of the chassis 10 and the remainder of the up-stop assembly 13 is positioned on the other (anterior) side of the gap G of the chassis 10. The up-stop clamp 61 is tightened down to grip the chassis 10 surface proximal the gap G by tightening a wing nut 62, thereby compressing a portion of the chassis 10 between the up-stop body 60 and the up-stop clamp 61. The diffuser 63 of the up-stop subassembly 13 is pivotally connected to the anterior side of the up-stop body 60. During cleaning operations, diffuser 63 is positioned as shown in FIGS. 1(*b*), 9(*a*), and 9(*b*) and the gaging surface 64, positioned at the anterior end of the diffuser 63 of the up-stop subassembly 13, is proximal or contacting the upper planar end of the cartridge 1 as depicted in FIG. 1(*b*). The diffuser 63 may be pivoted upward so that it is substantially parallel to the vertical section of the chassis 10, thereby providing a configuration in which the up-stop sub-assembly 13 is relatively protected from damage during transport. (See FIG. 2(*b*)).

To start the cartridge cleaning operation of device D, in a preferred embodiment, the plurality of detachable legs 11 are secured to the underside of the chassis 10 of the device D, preferably by securing each leg 11 in a socket 5 formed on the underside of the horizontal section of the chassis 10 so as to vertically support the chassis 10 as shown in FIGS. 1(*a*) and 1(*b*) during device D operation. A pressurized water source is connected to the device D by putting the water source in fluid communication with the water supply port 31 of the start/stop valve 15. In a preferred embodiment, the fluid communication between a pressurized water source and the water supply port 31 of the start/stop valve 15 is effected by a garden hose 2 connected to a spigot at one end and connected to the water supply port 31 of the start/stop valve 15 at the other end. In a preferred embodiment, the up-stop subassembly 13 is displaced vertically upward toward the top of the vertical section of the chassis 10.

A cartridge 1 is positioned on the rotatable platform spindle 72 of the rotatable platform subassembly 16. In a preferred embodiment, the cartridge 1 is positioned on the rotatable platform spindle 72 wherein a rotatable platform protrusion 71 on the spindle 72 is accommodated in the annular void space on one of the two planar ends of the cartridge 1. The diffuser 63 of the up-stop subassembly 13 is pivoted downward and the up-stop subassembly 13 is displaced vertically so that the upper surface of the cartridge 1 is proximal or in contact with the gaging surface 64 of the diffuser 63.

The spray subassembly 12 is then vertically displaced upward toward the upper end of the vertical section of the chassis 10 until it contacts with the up-stop subassembly 13 such that the spray subassembly 12 is positioned proximal the upper end of the filter 1. Preferably, the spray subassembly 12 is in contact with the registration surface 65 on the up-stop subassembly 13.

Water flow to the device D is then commenced. The free end of the operating lever 41 of the start/stop valve 15 is lifted thereby actuating a water flow regulator in the start/stop valve 15 so as to allow water to flow out of the discharge end of the garden hose 2 and through the water supply port 31 into the start/stop valve 15. The water flow into the start/stop valve 15 is split into two streams discharged from the start/stop valve 15. One discharge stream is directed out of the power unit supply port 39 of the start/stop valve 15 to the power unit fluid inlet port 45. The other discharge stream is directed out of the spray subassembly supply port 40 to the spray subassembly fluid inlet 58 of the spray subassembly 12.

Water flows through the one or more power units 19 of device D by entering the power unit fluid inlet port 45 and then directed out of the power unit nozzle 46. The water discharged out of the power unit nozzle 46 impacts and rotates the power wheel 47. The power wheel 47 is in rotatable contact with a plurality of compound gears 48 which transfers the torque produced by the power wheel 47 to either (i) a system of rotatably connected gears or (ii) a lead screw belt and pulley system and a rotatable platform belt and pulley system. In embodiments with a system of rotatably connected gears, the torque produced by rotation of the power wheel 47 is transferred to a rotatable platform driving gear 80 and, in preferred embodiments where vertical displacement of the spray subassembly is effectuated by rotation of a lead screw 52, a lead screw driving gear 82. Torque transferred to the rotatable platform driving gear 80 is transferred to the one or more idler gears 84 which in turn transfers torque to the rotatable platform driven gear 81 which, by virtue of attachment of the rotatable driven gear 81 to the rotatable platform spindle 72, effectuates rotation of the rotatable platform spindle 72. In embodiments with a system of rotatably connected gears and a lead screw 52 that effectuates vertical displacement of the spray subassembly 12, torque transferred to the lead screw driving gear 82 is transferred to the one or more idler gears 84 which in turn transfers torque to the lead screw driven gear 83 which, by virtue of attachment of the lead screw driven gear 83 to the lead screw 52, causes rotation of the lead screw 52 and vertical displacement of the spray subassembly 12.

In embodiments wherein torque from the rotating power wheel 47 is transferred to a lead screw belt and pulley system and a rotatable platform belt and pulley system, the torque produced by the power wheel 47 and transferred to the lead screw belt and pulley system actuates and rotates the lead screw driving pulley 33, with the torque generated from the rotation of the lead screw driving pulley 33 transferred to and rotating the lead screw driven pulley 32 via the lead screw drive belt 36 which joins the lead screw driving pulley 33 to the lead screw driven pulley 32. The torque from the lead screw driven pulley 32 is then transferred to the lead screw 52 to which the lead screw driven pulley 32 is attached, causing the rotation of the lead screw 52 and vertical displacement of the spray subassembly 12. The torque produced by the power wheel 47 and transferred to the rotatable platform belt and pulley system actuates and rotates the rotatable platform driving pulley 34, with the torque generated from the rotation of the rotatable platform driving pulley 34 transferred to and rotating the rotatable platform driven pulley 35 via the rotatable platform drive belt 37 which joins the rotatable platform driving pulley 34 to the rotatable platform driven pulley 35. Rotation of the rotatable platform driven pulley 35 causes rotation of the rotatable platform spindle 72 which is attached to the rotatable platform driven pulley 35. The rotation of the rotatable platform spindle 72 causes rotation of the cartridge 1 positioned on the upper surface of the rotatable platform spindle 72.

Alternatively, in embodiments wherein the vertical displacement of the spray subassembly 12 is effectuated by rotation of a belt carriage drive belt 25 of a spray subassembly belt drive system 29, the power wheel 47 is in rotatable contact with a plurality of compound gears 48 which transfers the torque produced by the rotating power wheel 47 to the driven pulley 26, with the torque then transferred to the one or more idler pulleys 27 via rotation of the carriage drive belt 25. The spray subassembly 12 is joined to the carriage drive belt 25, with the carriage drive belt 25 looped through a portion of the spray subassembly 12 such that the rotation of the carriage drive belt 25 causes the spray subassembly 12 to be vertically displaced. In such embodiments of the cleaning device D wherein vertical displacement of the spray subassembly 12 is effectuated by a spray subassembly belt drive system 29, torque from the rotating power wheel 47 may be transferred to the rotatable platform spindle 72 using either a rotatable platform belt and pulley system or a system of rotatably connected gears.

As indicated earlier, a discharge stream out of the start/stop valve 15 is directed out of the spray subassembly supply port 40 of the start/stop valve 15 to the spray subassembly fluid inlet 58 of the spray subassembly 12. The spray subassembly fluid inlet 58 is in fluid communication with the nozzle array 53 comprised of one or more nozzles. A spray is directed out of the one or more nozzles of the nozzle array 53 toward the cartridge 1 with the spray impacting the cartridge 1 surface to effectuate the removal of debris on such cartridge 1 surface.

In embodiments wherein the vertical displacement of the spray subassembly 12 is effectuated by rotation of the lead screw 52, the helical grooves of the lead screw 52 are mated with helical grooves 595 formed on the anterior surface of the void space 570 of the lead screw follower 57, which is inserted into the hollow chamber 590 of the lead screw follower housing 551. The torque from the rotation of the lead screw 52 is translated into vertical motion of the lead screw follower 57, effectuating the downward vertical displacement of the spray subassembly 12 in a direction parallel to the longitudinal axis of the cartridge 1 such that the spray emitted from the nozzle array 53 is directed to the cartridge 1 surface along the entire longitudinal length of the cartridge 1 downward from a position proximal the upper end of the vertical section of the chassis 10 to a position proximal the lower end of the vertical section of the chassis 10.

In embodiments wherein the vertical displacement of the spray subassembly 12 is effectuated by a spray subassembly belt drive system 29, torque transferred to the driven pulley 26 effectuates rotation of the carriage drive belt 25 and, by virtue of the spray subassembly 12 being joined to the carriage drive belt 25, vertical displacement of the spray subassembly 12 in a direction parallel to the longitudinal axis of the cartridge 1 such that the spray emitted from the nozzle array 53 is directed to the cartridge 1 surface along the entire longitudinal length of the cartridge 1 downward from a position proximal the upper end of the vertical section of the chassis 10 to a position proximal the lower end of the vertical section of the chassis 10.

Water emitted from the nozzle array 53 of the spray sub-assembly 12 and debris dislodged from the cartridge 1 surface flow downward due to gravity, with the flow channeled through the discharge port 22 (see FIG. 1(*b*)) positioned on the side of the chassis 10. A bucket 3, with or without a funnel 17 and funnel support 18, may be positioned below the discharge port 22 to collect discharged water and debris or the flow may be allowed to fall to the ground.

As the spray subassembly 12 reaches the lower limit of its vertical motion (proximal the lower portion of the vertical section of the chassis 10), a surface of the nozzle carriage 55 contacts the free end of the operating lever 41 of the start/stop valve 15, thereby depressing the operating lever 41, which in turn terminates the water flow to (i) the spray subassembly supply port 40, which connects to and is in fluid communication with the nozzle array 53 of the spray subassembly 12 thereby stopping the spray discharged out of the nozzle array 53, and (ii) the power unit supply port 39 of the start/stop valve 15, which connects to and is in fluid communication with the power unit fluid inlet port 45 of the power unit 19 of the start/stop valve 15 of the device D, which (i) stops the rotation of the cartridge 1, and (ii) stops the rotation of the lead screw 52 in embodiments wherein the vertical displacement of the spray subassembly 12 is effectuated by rotation of the lead screw 52 and, in alternative embodiments wherein the vertical displacement of the spray subassembly is effectuated by rotation of the carriage drive belt 25 of the spray subassembly belt drive system 29, stops the rotation of the carriage drive belt 25.

While embodiments of the invention have been illustrated and described, it is not intended that these embodiments illustrate and describe all possible forms of the invention. Rather, the words used in the specification are words of description rather than limitation, and it is understood that various changes may be made without departing from the sprit and scope of the invention.

I claim:
1. A cartridge cleaning device comprising:
   a. a fluid inlet valve in fluid communication with a pressurized fluid source and capable of controlling the flow of fluid through the valve;
   b. a spray subassembly in fluid communication with the fluid inlet valve and comprising one or more nozzles;
   c. a rotatable lead screw with an upper end and a lower end and wherein the lead screw (i) is mateably joined with the spray subassembly so as to effectuate vertical displacement of the spray subassembly upon rotation of the lead screw and (ii) has a lead screw driven pulley attached to the lower end;
   d. a rotatable platform subassembly comprising a rotatable platform spindle onto which at least one cartridge is positioned and a rotatable platform driven pulley attached to the rotatable platform spindle;
   e. a power unit in fluid communication with the fluid inlet valve and comprising a power unit nozzle and a power wheel in rotatable contact with a plurality of compound gears, wherein at least one compound gear is rotatably attached to (i) a lead screw driving pulley joined via a lead screw drive belt with the lead screw driven pulley and (ii) a rotatable platform driving pulley joined via a rotatable platform driving belt with the rotatable platform driven pulley;
   f. wherein fluid from the pressurized fluid source is directed from the fluid inlet valve to the spray subassembly and emitted from the one or more nozzles;
   g. wherein fluid from the pressurized fluid source is directed from the fluid inlet valve to the power unit and wherein fluid is emitted from the power unit nozzle toward the power wheel causing rotation of the power wheel and generating a torque and wherein the torque is transferred to the rotatable platform driving pulley and the lead screw driving pulley through the plurality of compound gears;
   h. wherein the torque from the rotatable platform driving pulley is transferred to the rotatable platform driven pulley thereby effectuating rotation of the rotatable platform; and
   i. wherein the torque from the lead screw driving pulley is transferred to the lead screw driven pulley thereby effectuating rotation of the lead screw and vertical displacement of the spray subassembly.

2. The cartridge cleaning device as claimed in claim 1, wherein one or more of the rotatable platform driving pulley, rotatable platform driven pulley, lead screw driving pulley, and lead screw driven pulley has one or more tiers.

3. The cartridge cleaning device as claimed in claim 1, further comprising a chassis to which are mounted the fluid inlet valve, the spray subassembly, the lead screw, the rotatable platform, and the power unit.

4. The cartridge cleaning device as claimed in claim 3, further comprising a plurality of support legs, each leg having an upper end and a lower end, and wherein the upper end of each support leg is joined to the chassis.

5. The cartridge cleaning device as claimed in claim 3, wherein the chassis is comprised of a plurality of members.

6. The cartridge cleaning device as claimed in claim 3, further comprising an up-stop assembly comprising an upper vertical position and a lower vertical position and an anterior end and a posterior end secured to the chassis, wherein (i) the up-stop assembly is vertically displaceable, (ii) the anterior end is in contact with at least one cartridge during cleaning operations, and (iii) the upper vertical position of the up-stop assembly establishes the upper vertical position of the spray subassembly during cleaning operations.

7. The cartridge cleaning device as claimed in claim 3, wherein the chassis comprises a vertical section and a horizontal section integral or joined with the vertical section and wherein the horizontal section has an opening over which the power unit is positioned.

8. A cartridge cleaning device comprising:
   a. A fluid inlet valve in fluid communication with a pressurized fluid source;
   b. A spray subassembly in fluid communication with the fluid inlet valve and comprising one or more nozzles;
   c. A rotatable lead screw system or vertically displacing the spray subassembly comprising a rotatable lead screw with an upper end and a lower end and wherein the lead screw (1) is mateably joined with the spray subassembly so as to effectuate vertical displacement of the spray subassembly upon rotation of the lead screw and (2) has a lead screw driven pulley attached to the lower end;
   d. A rotatable platform subassembly comprising a rotatable platform spindle onto which at least one cartridge is positioned;
   e. A power unit in fluid communication with the fluid inlet valve and comprising a power unit nozzle and a power wheel in rotatable contact with a plurality of compound gears;
   f. Wherein fluid from the pressurized fluid source is directed from the fluid inlet valve to the spray subassembly and emitted from the one or more nozzles;
   g. Wherein fluid from the pressurized fluid source is directed from the fluid inlet valve to the lower unit and wherein fluid is emitted from the power unit nozzle toward the power wheel causing rotation of the power wheel and generating a torque;
   h. A rotatable platform belt and pulley system for transferring the torque from the rotating power wheel to the rotatable platform subassembly; and
   i. a lead screw belt and pulley system for transferring the torque from the rotating power wheel to the rotatable lead screw.

9. The cartridge cleaning devices claimed in claim 8:
   a. wherein the lead screw belt and pulley system comprises a lead screwdriver pulley attached to the lead screw, a lead screw driving pulley attached to at least one compound gear of the power unit, and a lead screw drive belt joining the lead screw driven pulley with the lead screw driving pulley; and
   b. wherein the rotatable platform belt and pulley system comprises a rotatable platform driven pulley attached to the rotatable platform spindle, a rotatable platform driving pulley attached to at least one compound gear of the power unit, and a rotatable platform drive belt joining the rotatable platform driven pulley with the rotatable platform driving pulley.

* * * * *